(12) United States Patent
Salsi

(10) Patent No.: US 9,967,048 B1
(45) Date of Patent: May 8, 2018

(54) OPTICAL TRANSCEIVER WITH EXTERNAL LASER SOURCE

(71) Applicant: JUNIPER NETWORKS, INC., Sunnyvale, CA (US)

(72) Inventor: Massimiliano Salsi, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days. days.

(21) Appl. No.: 15/485,202

(22) Filed: Apr. 11, 2017

Related U.S. Application Data

(60) Provisional application No. 62/408,316, filed on Oct. 14, 2016.

(51) Int. Cl.
| | |
|---|---|
| H04J 14/02 | (2006.01) |
| H04J 14/06 | (2006.01) |
| H04B 10/079 | (2013.01) |
| H04B 10/40 | (2013.01) |

(52) U.S. Cl.
CPC .... H04J 14/0202 (2013.01); H04B 10/07955 (2013.01); H04B 10/40 (2013.01); H04J 14/06 (2013.01); H04J 14/0221 (2013.01)

(58) Field of Classification Search
CPC ............... H04B 10/07955; H04B 10/40; H04J 14/0202; H04J 14/06; H04J 14/0221
USPC .......................................................... 398/34
See application file for complete search history.

(56) References Cited

U.S. PATENT DOCUMENTS 7,492,992 B1 * 2/2009 Tyan ................. G02B 6/12004
　　　　　　　　　　　　　　　　　　　　　　　　　 385/15
8,184,984 B1 * 5/2012 Wang ..................... H04B 10/40
　　　　　　　　　　　　　　　　　　　　　　　　　 398/135
8,483,577 B2　7/2013　Mazzini et al.
8,494,368 B2　7/2013　Xie et al.
8,837,870 B1　9/2014　Wang et al.
(Continued)

FOREIGN PATENT DOCUMENTS

EP　　　　1203971 A1　5/2002
WO　WO 2016/145310 A1　9/2016

OTHER PUBLICATIONS

Multisource Agreement for 100G Long-Haul DWDM Transmission Module—Electromechanical; Optical Internetworking Forum, Jun. 8, 2010 [online], [retrieved on Aug. 29, 2017]. Retrieved from the Internet <URL: http://www.oiforum.com/public/documents/OIF-MSA-100GLH-EM-01.0.pdf>.

(Continued)

*Primary Examiner* — Dalzid Singh
(74) *Attorney, Agent, or Firm* — Cooley LLP

(57) ABSTRACT

A wavelength division multiplexing (WDM) transceiver module comprising an optical port and an optical modulator is disclosed herein. The optical port includes a data transmit and receive optical fiber connector and a laser source-in optical fiber connector. The laser source-in optical fiber connector is configured to couple to a laser source external to the WDM transceiver module, and provide polarization alignment for a polarization-maintaining fiber. The optical modulator is configured to receive a laser output from the external laser source via the polarization-maintaining fiber and modulate the laser output based on analog electrical signals generated by a digital signal processor. The WDM transceiver module may not including an onboard laser source.

20 Claims, 13 Drawing Sheets

(56) References Cited

U.S. PATENT DOCUMENTS

| | | |
|---|---|---|
| 8,948,614 B1 | 2/2015 | Schmidt et al. |
| 2003/0048502 A1 | 3/2003 | Yu et al. |
| 2003/0198445 A1 | 10/2003 | Inujima et al. |
| 2005/0201761 A1* | 9/2005 | Bartur .................. H04B 10/071 398/197 |
| 2007/0003281 A1* | 1/2007 | Mitchell .......... H04B 10/25073 398/38 |
| 2007/0116478 A1* | 5/2007 | Chen ........................ G01J 1/04 398/195 |

OTHER PUBLICATIONS

Berthold et al., "100G Ultra Long Haul DWDM Framework Document," Optical Internetworking Forum (OIF), Accessed Feb. 1, 2012, 10 pp., [retrieved on Aug. 29, 2017]. Online: http://www.oiforum.com/public/documenhts/OIF-FD-100G-DWDM-01.0.pdf.
Extended European Search Report for European Application No. 17196430.7, dated Feb. 26, 2018, 9 pages.

* cited by examiner

OPTICAL TRANSCEIVER WITH EXTERNAL LASER SOURCE

CROSS REFERENCES TO RELATED APPLICATIONS

This application is a non-provisional of and claims priority under 35 U.S.C. § 119 to U.S. provisional application Ser. No. 62/408,316, filed Oct. 14, 2016, titled "Optical Transceiver with External Laser Source," which is expressly incorporated herein by reference in its entirety.

FIELD OF THE DISCLOSURE

This document pertains generally, but not by way of limitation, to a wavelength division multiplexing (WDM) optical transceiver module, and particularly, to a WDM optical transceiver module that relies on a laser source that is external to the WDM optical transceiver module.

BACKGROUND

It is difficult to meet the density and throughput demand on the line cards operating with WDM optics, also called colored optics or line optics. If WDM optics cannot meet such demands and consequently are perceived as a waste of router switching capacity, then grey optics—the alternative to WDM optics—may be connected to third party external transponder shelves.

The gap between WDM optics and grey optics results from the inclusion in WDM optics of at least one temperature controlled tunable laser source. Such laser sources occupy a large part of WDM optics such as WDM optical modules. For example, over $_{30}$% of the real estate could be occupied by laser sources, such that the laser sources set a floor on the size of WDM optical modules and a ceiling on the density of WDM optical modules.

The laser source is often the only element of WDM optical modules that requires a thermo-electric cooler (TEC). Thus compared to other elements on the WDM optical module, the laser source imposes the strictest requirements on the case temperature and heat dissipation.

The laser source height is difficult to reduce. For example, the integrated laser assembly height adds with the printed circuit board assembly (PCBA) and prevents the assembly from fitting into the 9.5 mm dimension of CFP8/CFP4 modules.

The laser source can consume, for example, more than 30% of the power of WDM optical modules, including the TEC. Typical numbers are about 3 W. Optimistic projections for the future are around 2 W.

The optical power of micro-integrable tunable laser assemblies (μITLA) in the modules can generate insufficient optical power with acceptable power consumption, or else generate sufficient optical power with unacceptable power consumption. An optical amplifier may be required in order to overcome insufficient optical power.

The laser source is not integrated in the transmitter/receiver. The laser source is a separate chip coupled with a fiber to the transmitter optical sub-assembly and receiver optical sub-assembly (TOSA and ROSA). Prospective gains from integration are limited in terms of size and power.

When WDM optics are a coherent transceiver, WDM optics also include a very powerful DSP and power consuming optoelectronics (e.g., a polarization multiplexed in-phase and quadrature (PM-IQ) modulator with a quad-driver and 4 digital-to-analog converters (DACs), and an integrated coherent receiver (ICR) paired with 4 receivers and 4 transimpedance amplifiers (TIAs)).

Due to the inclusion of such elements, it is difficult to reduce the size and power consumption of WDM optics modules down to grey optics modules. Low-power digital signal processing (DSP) and low-power optics, integration on-board, and so on are all helpful aspects that do not give a fundamental advantage to WDM optics; when grey optics uses the same such technology, grey optics consume less power and occupy less space than its WDM counterpart.

SUMMARY OF THE DISCLOSURE

Embodiments of the current disclosure include a wavelength division multiplexing (WDM) transceiver module comprising an optical port and an optical modulator operatively coupled to the optical port. The optical port includes a data transmit optical fiber connector and a data receive optical fiber connector; and a laser source-in optical fiber connector configured to couple to a laser source external to the WDM transceiver module, and provide polarization alignment for a polarization-maintaining fiber. The optical modulator may be operatively coupled to the optical port and configured to receive a laser output from the external laser source via the polarization-maintaining fiber and modulate the laser output based on analog electrical signals generated by a digital signal processor. In some embodiments, the WDM transceiver module may not include an onboard laser source and may be operatively coupleable to or capable of integrated into a host board.

In some embodiments, the WDM transceiver module is coupleable to the host board such that the WDM transceiver module is pluggable into the host board. In some embodiments, the WDM transceiver module is coupleable to the host board such the WDM transceiver module is pluggable into the host board and does not include the digital signal processor. Yet in some embodiments, the WDM transceiver module is integrated into the host board.

In some embodiments, the optical port further includes an optical pump-in optical fiber connector configured to couple to one or more external optical pumps. The optical pump-in optical fiber connector may include a specific-wavelength fiber, an operative wavelength of the specific-wavelength fiber substantially matching a wavelength of the optical pump laser.

In some embodiments, the WDM transceiver module may be a coherent WDM transceiver module, and the optical modulator can be a polarization multiplexed in-phase and quadrature (PM-IQ) modulator configured to separately modulate in-phase and quadrature components of the laser output. In some embodiments, the WDM transceiver module may be a non-coherent WDM transceiver module and the optical modulator may be or may not be configured to modulate a phase component of the laser output.

In some embodiments, the WDM transceiver module may comprise a power monitor operatively coupled to the optical modulator and configured to monitor an optical power of the laser output received from the external laser source.

In some embodiments of the current disclosure, a system comprising a wavelength division multiplexing (WDM) transceiver module and a control unit is disclosed. The WDM transceiver module includes a laser source-in optical fiber connector configured to receive a first laser output after transmission of a second laser output from an external laser source external to the WDM transceiver module. In some embodiments, the WDM transceiver module may not include an onboard laser source and may be operatively coupleable to a host board. The control unit may be configured to receive a second laser output data from the external laser source and a first laser output data from the WDM transceiver module. In some embodiments, the control unit may be configured to: analyze the first laser output data and the second laser output data so as to determine information related to laser transmission conditions of the WDM transceiver module; and generate a control message for transmission to the external laser source based on the determined information.

In some embodiments, the determined information includes one or more of a power level of the second laser output from the external laser source, fiber loss during transmission of the second laser output from the external laser source, and alarm status of the WDM transceiver module. Further, the control message may include instructions on an adjustment to a power level of the second laser output prior to transmission to the WDM transceiver module by the external laser source. The control message is transmitted to the external laser source via a control network coupled to the control unit and the external laser source. In some embodiments, the WDM transceiver module may comprise a power monitor operatively coupled to the WDM transceiver module and configured to monitor a power level of the first laser output. The WDM transceiver module may include a Mach-Zehnder modulator that is configured to generate at least a portion of the first laser output data based on the monitored power level.

In some embodiments of the current disclosure, a system comprising a wavelength division multiplexing (WDM) optical transceiver module and a control unit is disclosed. The WDM optical transceiver module may be configured to receive a laser output transmitted by an external laser source external to the WDM transceiver module and the module may not include an onboard laser source. In some embodiments, the control unit may be configured to receive data related to transmission of the laser output to the WDM transceiver module. Further, the control unit may be configured to generate a control signal based at least in part on the received data, and may transmit the control signal to the external laser source. In some embodiments, the transmission of the laser output to the WDM transceiver module and the transmission of the control signal to the external laser source occur via a same bi-directional cable.

In some embodiments, the control signal may be an electrical signal and the bi-directional cable may include an electrical wire for transmitting the electrical signal. In some embodiments, the control signal may be an optical signal, and the laser output and the control signal may be transmitted via the same polarization maintaining optical fiber, the bi-directional cable including the polarization maintaining optical fiber. In some embodiments, the laser output and the control signal may be transmitted via a slow axis and a fast axis, respectively, of the polarization maintaining optical fiber. In some embodiments, the control signal is an optical signal, the laser output is an unmodulated laser beam, and the bi-directional cable includes an optical fiber. Further, the laser output and the control signal may be transmitted out of band via the optical fiber.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In example embodiments, a WDM optical transceiver module relies on an external laser source. For example, the WDM optical transceiver module can be operatively coupled to and receive laser power from a laser source that is external to the module itself. In such embodiments, the WDM optical transceiver module may not have any laser source onboard the module itself. In other embodiments, the WDM optical transceiver module can have a laser source onboard, and yet can also be operatively coupled to and receive laser power from an external laser source. The embodiments where the module does not have a laser source onboard (and instead relies solely on an external laser source) have the advantages of a WDM optical transceiver module without the bulk and the temperature-related and heat-dissipation- related strict requirements on the module case (or housing or form) that come about due to the inclusion of the laser source in the WDM optical transceiver module. Further, other elements or components that usually accompany the laser source such as thermos-electric coolers (TECs) can also be removed from the WDM optical transceiver module when the module does not have an onboard laser source and relies on an external laser source. In some embodiments, the lack of a laser source (and associated elements such as TECs) from a WDM optical transceiver module allows for an appreciable reduction in size and power consumption of the module during operation.

Examples of WDM optical transceiver modules include: digital pluggable modules (e.g., digital coherent optics (DCO) pluggable modules like the Acacia 100G C form-factor pluggable (CFP) AC100M or direct detect optics like the Inphi ColorZ 100GBE-QSFP28-WDM2); analog pluggable modules (e.g., analog coherent optics (ACO) pluggable modules like the CFP2-ACO used on Juniper line cards on the PTX and MX platforms, PTX-5-100G-WDM and MIC3-100G-DWDM respectively); multi-source agreement (MSA) modules; on-board optics (e.g. Optical Internetworking Forum (OIF) 2016.301.00); and other WDM optic assemblies.

Figure 1:
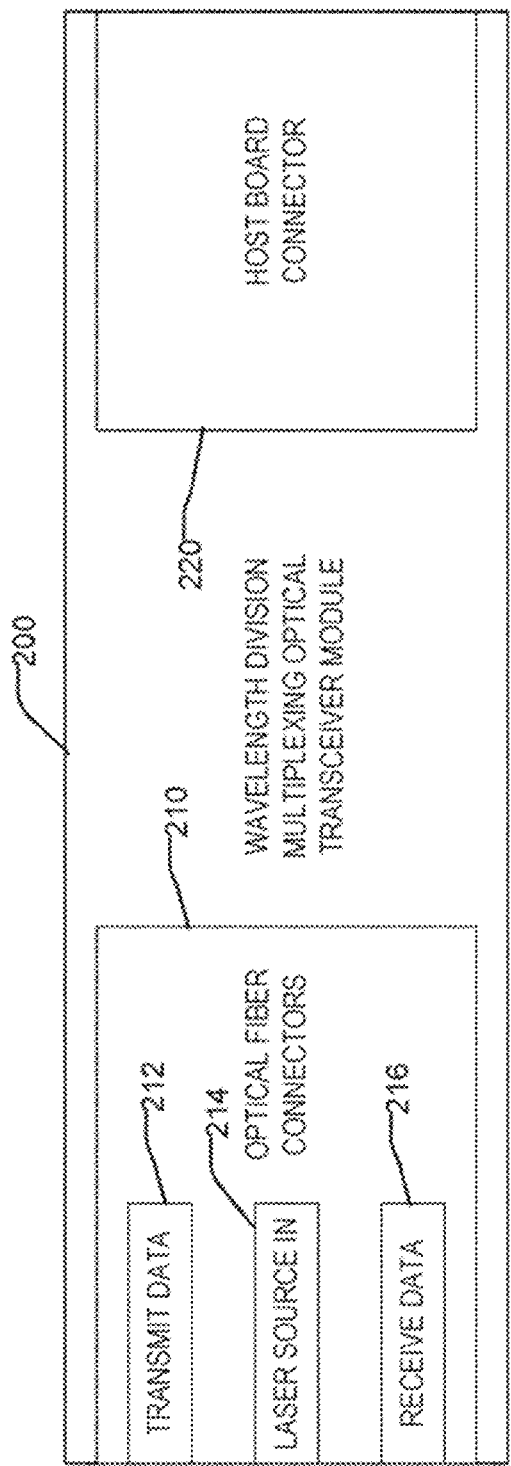
FIGS. 1-2 are diagrams showing general examples of a WDM optical transceiver module.
Figure 2:
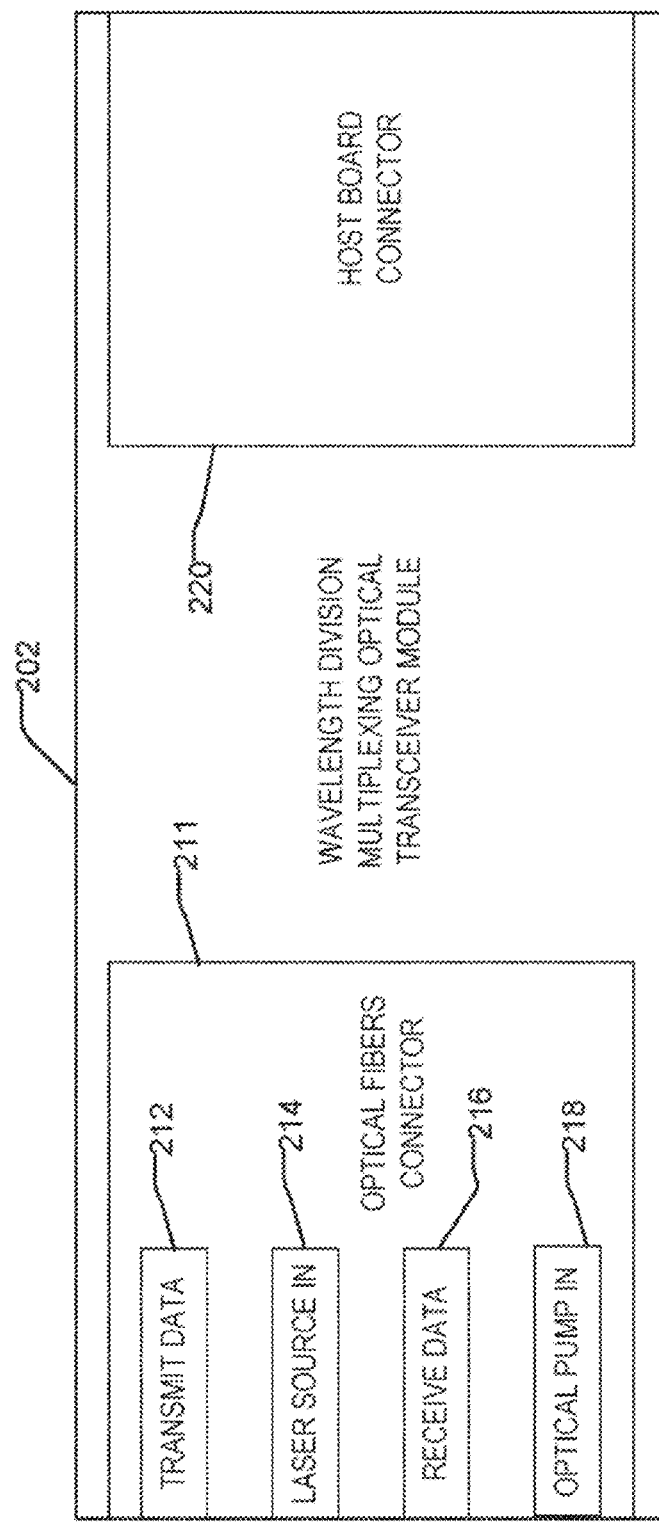

FIGS. 1-2 are diagrams showing general examples of a WDM optical transceiver module. FIG. 1 is a diagram of WDM optical transceiver module 200 with optical fiber connectors 210 and host board connector 220. Optical fiber connectors 210 includes multiple connectors for multiple optical fibers, including transmit data optical fiber connector 212, laser source in optical fiber connector 214, and receive data optical fiber connector 216. WDM optical transceiver module 200 is coupled to a laser source via laser source in optical fiber connector 214. As a result, some embodiments of the WDM optical transceiver module 200 rely on a laser source external to the WDM optical transceiver module 200. In such embodiments, the WDM optical transceiver module 200 may or may not have a laser source in the WDM optical transceiver module 200 itself.

FIG. 2 is a diagram of WDM optical transceiver module 202 similar to WDM optical transceiver module 200. Optical fiber connectors 211, compared to optical fiber connectors 210, adds optical pump in optical fiber connector 218. WDM optical transceiver module 202 is coupled to an optical pump via optical pump in optical fiber connector 218. As a result, some embodiments of the WDM optical transceiver module 202 rely on an optical pump external to the WDM optical transceiver module 202. In such embodiments, the WDM optical transceiver module 200 may or may not have a laser source in the WDM optical transceiver module 200 itself.

In typical optical transport networks, the optical signal between two WDM optical transceiver modules is transmitted over fiber pairs. In an example implementation one or multiple modules, such as tens or hundreds, are connected to an optical node formed by a combination of programmable or fixed multiplexers, optical amplifiers, filters, attenuators, and so on. The optical signals are combined together, optically amplified, and sent all together on the same fiber pair over several tens of kilometers. Every 50 km or so there is an optical amplifier. In a submarine system implementation, signals can travel up to 12,000 km through hundreds of amplifiers. In meshed terrestrial networks, the signals can travel through multiple optical nodes. At each node, each one of the signals that came from the same fiber pair can be sent toward different directions. At the destination node optical signals are demultiplexed and another optical module receives the desired optical signal.

WDM optical transceiver module is coherent or non-coherent, using phase information or not. Coherent modules can carry 100 Gb/s and beyond over long distances. A recent example of an application of non-coherent modules limited to very short WDM links, below 100 km, was based on direct-detect PAM modulation formats with DSP based equalization. In some embodiments, the WDM transceiver module may be a non-coherent WDM transceiver module, and such a transceiver module can comprise an optical modulator that may or may not be configured to modulate a phase component of the laser output.

WDM optical transceiver module is pluggable vs on-board, referring to how the module is connected to the host. The module can be placed on a line card in a factory, like a 100G MSA module. Or, the module can be a pluggable module, like CFP MSA.

A coherent WDM optical transceiver module is analog coherent optics or digital coherent optics (ACO or DCO). DCO includes powerful digital signal processing (DSP). DCO receives digital data and the DSP generates the analog signals that are sent toward the electro-optical converters. Also the DSP receives the analog signals from the opto-electrical converters, demodulate the RX signal, and sends to the host the digital data signals. The DSP is in the module. The interface is an often-standardized digital interface, such as CAUI-4. In the case of ACO the DSP sits on the host and the interface is a connector on top of which the analog signals are transported. A WDM optical module, when it is pluggable, can include or not include the DSP.

Some embodiments of a WDM optical transceiver module include, but are not limited to:
  Non-coherent and pluggable;
  Non-coherent and on-board;
  Digital, coherent, and pluggable;
  Digital, coherent, and on-board; and
  Analog, coherent, and pluggable;

A coherent WDM optical transceiver module encodes and decodes; and transmits and receives an electrical signal that is converted to and from an optical signal that transits the optical fibers of an optical transport system. A coherent WDM optical transceiver module includes a transmitter and receiver.

The transmitter has one or more of the following elements:
  A digital signal processor (DSP) that receives and processes a series of digital signals. The process includes: encoding, mapping, digital filtering, equalization, and lead to the generation at the output of the digital-to-analog converters of a series of analog electrical signals.
  A driver that amplifies the analog electrical signals in order to achieve the required peak-to-peak output to meet the modulator's needs. The driver is a multi-channel element, with a dedicated amplifier for each analog electrical signal.
  An optical modulator that receives an unmodulated laser source from outside the WDM optical transceiver module through a polarization maintaining fiber and modulates the laser based on the analog electrical signals received from the DSP or directly from the host in case of—ACO optics. If the module is coherent the modulator can be a polarization multiplexed complex modulator (PM-IQ) that typically has 4 input signals for separately modulating the in-phase (I) and quadrature (Q) components of each one of the two orthogonal polarizations (often referred to as WV or X/Y) of the light. The modulator takes care of the necessary polarization rotation between the X and Y signals to form a polarization multiplexed optical signal. If the module is non-coherent the modulator can be a traditional Mach-Zehnder modulator or a phase modulator or an IQ modulator. The first two uses one analog signal and an IQ modulator uses two analog signals.
  Signal conditioning elements can be before, after, or both before and after the modulator. Example elements are optical amplifiers (e.g., semiconductor optical amplifiers or erbium doped fiber amplifiers), variable optical attenuators, shutters, or optical filters.
  Signal telemetry element like power taps that allow for capturing a calibrated small amount of a light in order to measure the optical power. At least one power monitor measures the incoming light from the external laser source in addition to other ones in a module.
  If more than one optical carrier is modulated in the module, such that multiple laser sources are coming from outside and multiple optical modulators are present, then there can also be a multiplexer in the form of an optical interleaver, an optical coupler, or an arrayed waveguide multiplexer (AWG).
  One or multiple optical TX ports where the transmitted signal(s) are sent to the optical transport system.

Embodiments of the transmitter generally include one or multiple optical TX ports.

Control logic for the driver, modulator biasing points, other elements, and power supplies. Embodiments of the transmitter generally include control logic.

Some embodiments of the transmitter include, but are not limited to:

DSP;
Driver;
Optical modulator;
Signal conditioning elements;
Signal telemetry element;
Multiplexer;
DSP and driver;
DSP and optical modulator;
DSP and signal conditioning elements;
DSP and signal telemetry element;
DSP and multiplexer;
Driver and optical modulator;
Driver and signal conditioning elements;
Driver and signal telemetry element;
Driver and multiplexer;
Optical modulator and signal conditioning elements;
Optical modulator and signal telemetry element;
Optical modulator and multiplexer;
Signal conditioning elements and signal telemetry element;
Signal conditioning elements and multiplexer;
Signal telemetry element and multiplexer;
DSP, driver, and optical modulator;
DSP, driver, and signal conditioning elements;
DSP, driver, and signal telemetry element;
DSP, driver, and multiplexer;
DSP, optical modulator, and signal conditioning elements;
DSP, optical modulator, and signal telemetry element;
DSP, optical modulator, and multiplexer;
DSP, signal conditioning elements, and signal telemetry element;
DSP, signal conditioning elements, and multiplexer;
DSP, signal telemetry element, and multiplexer;
Driver, optical modulator, and signal conditioning elements;
Driver, optical modulator, and signal telemetry element;
Driver, optical modulator, and multiplexer;
Driver, signal conditioning elements, and signal telemetry element;
Driver, signal conditioning elements, and multiplexer;
Driver, signal telemetry element, and multiplexer;
Optical modulator, signal conditioning elements, and signal telemetry element;
Optical modulator, signal conditioning elements, and multiplexer;
Signal conditioning elements, signal telemetry element, and multiplexer;
DSP, driver, optical modulator, and signal conditioning elements;
DSP, driver, optical modulator, and signal telemetry element;
DSP, driver, optical modulator, and multiplexer;
DSP, driver, signal conditioning elements, and signal telemetry element;
DSP, driver, signal conditioning elements, and multiplexer;
DSP, driver, signal telemetry element, and multiplexer;
DSP, optical modulator, signal conditioning elements, and signal telemetry element; and
DSP, optical modulator, signal conditioning elements, and multiplexer;
DSP, optical modulator, signal telemetry element, and multiplexer;
DSP, signal conditioning elements, signal telemetry element, and multiplexer;
Driver, optical modulator, signal conditioning elements, and signal telemetry element;
Driver, optical modulator, signal conditioning elements, and multiplexer;
Driver, signal conditioning elements, signal telemetry element, and multiplexer;
Optical modulator, signal conditioning elements, signal telemetry element, and multiplexer;
DSP, driver, optical modulator, signal conditioning elements, and signal telemetry element;
DSP, driver, optical modulator, signal conditioning elements, and multiplexer;
DSP, driver, optical modulator, signal telemetry element, and multiplexer;
DSP, driver, signal conditioning elements, signal telemetry element, and multiplexer;
DSP, optical modulator, signal conditioning elements, signal telemetry element, and multiplexer;
Driver, optical modulator, signal conditioning elements, signal telemetry element, and multiplexer;
DSP, driver, optical modulator, signal conditioning elements, signal telemetry element, and multiplexer;

The receiver has one or more of the following elements:

RX optical port(s) that receives one or multiple optical signal(s) from the optical transport system. Embodiments of the transmitter generally include one or multiple RX optical ports.

Optical signal conditioning elements such as a variable attenuator, optical amplifier, shutter, optical filter, and so on.

In a coherent embodiment, for each signal a coherent mixer for each polarization that creates beating between the received signal and a local oscillator that comes from outside the WDM optical transceiver module. For example, the local oscillator is from the TX laser source that comes from outside the WDM optical transceiver split between TX and RX with a polarization maintaining splitter. In general a polarization beam splitter splits the RX signal among the two coherent mixers, one per polarization. A non-coherent embodiment can omit the mixer.

Photodiodes, such as 2 per mixer, for a total of 4 per polarization. An embodiment has balanced photodiodes that are pairs of photodiodes in a specific configuration. The photodiodes convert the optical signal into an analog electrical signal. For a non-coherent embodiment a single photodiode is sufficient.

Electrical amplifiers for the analog electrical signal, typically trans-impedance amplifiers (TIA). Typically 4 for each received signal (IQ/XY). For non-coherent a single amplifier is the minimum.

Analog-to-digital converter and digital signal processing (DSP) that performs a long series of operations: equalization, time recovery, chromatic dispersion compensation, polarization demultiplexing, carrier phase and frequency recovery, demodulation, and decoding. For a non-coherent embodiment the list is generally shorter, such as equalization and time recovery. For—ACO the DSP is not on the module so the module finishes with the signal output from the electrical TIA.

Control logic for the element, such as a power monitor on the received power from the laser source if the transmit laser source is not shared. Embodiments of the receiver generally include control logic.

Figure 3:
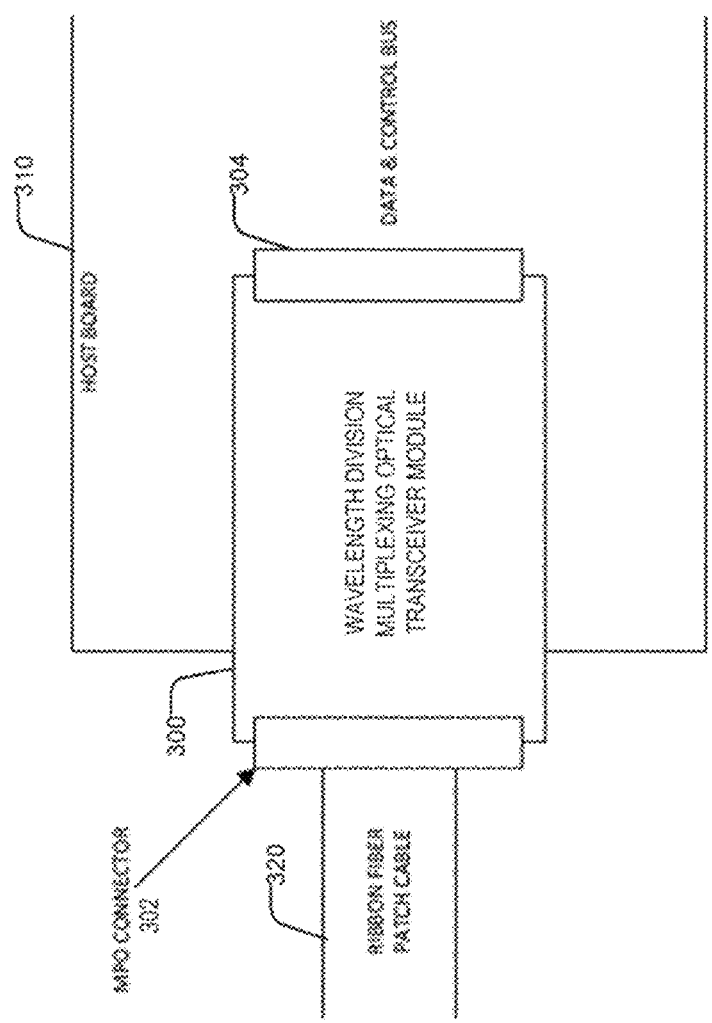
FIG. 3 is a diagram of an example of a WDM optical transceiver module coupled in between a host board an optical fiber ribbon cable.

Some embodiments of the receiver include, but are not limited to:

Optical signal conditioning elements;
Coherent mixers;
Photodiode(s);
Electrical amplifiers;
Analog-to-digital converter and DSP;
Optical signal conditioning elements and coherent mixers;
Optical signal conditioning elements and photodiode(s);
Optical signal conditioning elements and electrical amplifiers;
Optical signal conditioning elements and analog-to-digital converter and DSP;
Coherent mixers and photodiode(s);
Coherent mixers and electrical amplifiers;
Coherent mixers and analog-to-digital converter and DSP;
Photodiode(s) and electrical amplifiers;
Photodiode(s) and analog-to-digital converter and DSP;
Electrical amplifiers and analog-to-digital converter and DSP;
Optical signal conditioning elements, coherent mixers, and photodiode(s);
Optical signal conditioning elements, coherent mixers, and electrical amplifiers;
Optical signal conditioning elements, coherent mixers, and analog-to-digital converter and DSP;
Optical signal conditioning elements, photodiode(s), and electrical amplifiers;
Optical signal conditioning elements, photodiode(s), and analog-to-digital converter and DSP;
Optical signal conditioning elements, electrical amplifiers, and analog-to-digital converter and DSP;
Coherent mixers, photodiode(s), and electrical amplifiers;
Coherent mixers, photodiode(s), and analog-to-digital converter and DSP;
Coherent mixers, electrical amplifiers, and analog-to-digital converter and DSP;
Photodiode(s); electrical amplifiers and analog-to-digital converter and DSP;
Optical signal conditioning elements, coherent mixers, photodiode(s), and electrical amplifiers;
Optical signal conditioning elements, coherent mixers, photodiode(s), and analog-to-digital converter and DSP;
Optical signal conditioning elements, coherent mixers, electrical amplifiers, and analog-to-digital converter and DSP;
Optical signal conditioning elements, photodiode(s), electrical amplifiers and analog-to-digital converter and DSP;
Coherent mixers, photodiode(s), electrical amplifiers, and analog-to-digital converter and DSP;
Optical signal conditioning elements, coherent mixers, photodiode(s), electrical amplifiers, and analog-to-digital converter and DSP;

FIG. 3 is a diagram of an example of a WDM optical transceiver module coupled in between a host board an optical fiber ribbon cable. WDM optical transceiver module 300 has a first connector 302 such as a multi-fiber push on (MPO) connector and a second connector 304 to host board 310. First connector 302 is an optical port connected to the rest of the optical network. In some implementations the WDM optical transceiver module 300, which may not have a laser source in the WDM optical transceiver module 300 itself, is coupled to a laser source via first connector 302. In other words, the first connector 302 may connect the WDM optical transceiver module 300 to both an optical network and a laser source that is external to the WDM optical transceiver module 300. For example, the first connector 302 can be configured to receive or be connected to a ribbon fiber patch cable 320 that contains different types of fibers, one of which carries one type of laser beam. For example, a ribbon fiber patch cable 320 may contain one or more of different types of fibers such as but not limited to single mode fibers, polarization maintaining fibers and pump laser fibers, respectively corresponding to standard optical signals, unmodulated continuous wave (CW) laser source beams and pump laser beams. In other embodiments the WDM optical transceiver module 300 is coupled to a laser source via a connector other than first connector 302 (e.g., instead of or in addition to being connected via the first connector 302).

In some embodiments the WDM optical transceiver module 300 is coupled to an optical pump via first connector 302. In other embodiments the WDM optical transceiver module 300 is coupled to an optical pump via a connector other than first connector 302 (e.g., instead of or in addition to being connected via the first connector 302).

Second connector 304 is an electrical connector that carries data and control signals between WDM optical transceiver module 300 and host board 310. Such data signals can be digital or analog.

Figure 4:
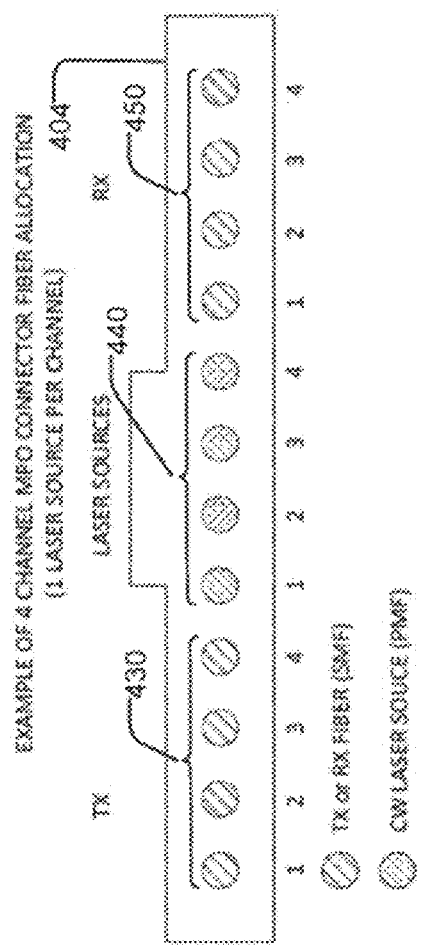
FIGS. 4-5 are diagrams showing examples of the connector in between the WDM optical transceiver module and the optical fiber ribbon cable.
Figure 5:
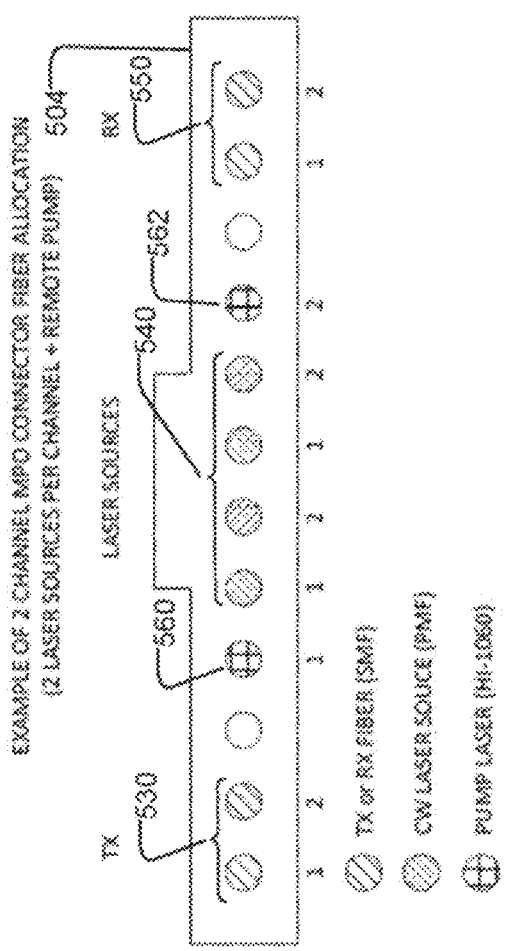

FIGS. 4-5 are diagrams showing examples of the connector in between the WDM optical transceiver module and the optical fiber ribbon cable. In FIG. 4, MPO connector 404 connects 4 channels, including 1 laser source per channel. MPO connector 404 connects 4 transmit single mode optical fibers (SMF) 430, 4 laser source polarization maintaining optical fibers (PMF) 440, and 4 receive SMF 450.

In FIG. 5, MPO connector 504 connects 2 channels, including 2 laser sources per channel and an optical pump per channel. MPO connector 504 connects 2 transmit SMF 530, 4 laser source PMF 540, 2 receive SMF 550, a transmit optical pump optical fiber 560, and a receive optical pump optical fiber 562.

In FIGS. 4-5, the MPO connector is an optical port made of multiple varieties of optical fibers including single mode fibers, polarization maintaining fibers, and pump laser fibers (e.g. HI-1060). The optical port can be an MPO connector, or another connector, that is used to connect a ribbon fiber cable. The fibers in the ribbon are different varieties including single mode fibers, polarization maintaining fibers, and pump laser fibers. The fiber used for modulated optical signal can be single mode or multi-mode. The fibers of the unmodulated continuous wave (CW) laser source are polarization maintaining fibers. The optional fibers of the pump lasers are fibers designed for that specific pump laser wavelengths, for example HI-1060 for 980 nm pump lasers. Other embodiments vary the number of channels, the total number of fibers, and the number of fibers of each variety of fiber. For example, in some embodiments, the number of channels can be 1, 2, 3, 4, 5, 6, 7 or 8.

It should be noted that, in any of the embodiments discussed herein, the disclosed fibers can be attached to the module via any number of connectors. For example, as in the example embodiments discussed above, the fibers may be attached to the module via a single connector. In some embodiments, however, a plurality of connectors may be used and the fibers maybe bundled or groups into separate sets and each set may use a dedicated connector selected from the plurality of connectors to connect to the module.

For example, it would be possible to maintain a legacy compatibility to existing systems by using a connector for TX/RX fibers only (for example, as existing modules with internal laser sources) and in addition a second connector may be used for connecting the laser sources through polarization maintaining fibers.

Figure 6A:
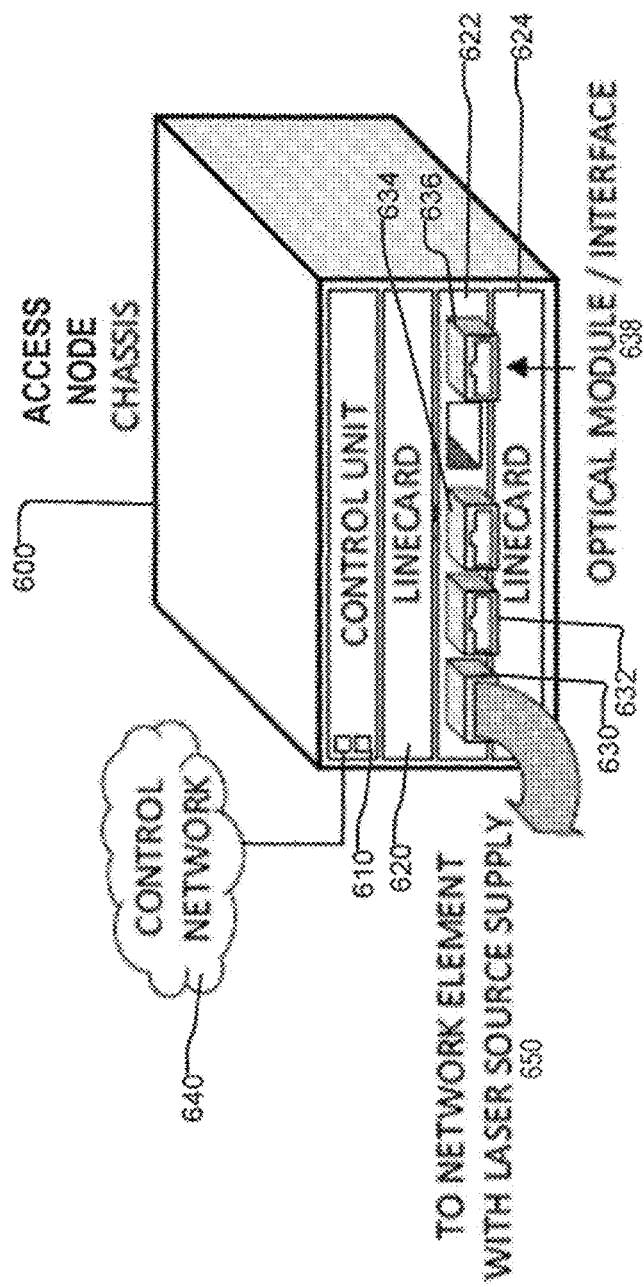
FIGS. 6A-B show a diagram showing a general example of an access node chassis with a WDM optical transceiver module (FIG. 6A) and a module with two separate connectors, one for receiving TX/RX fibers and another for receiving polarization-maintaining ones (FIG. 6B).
Figure 6B:
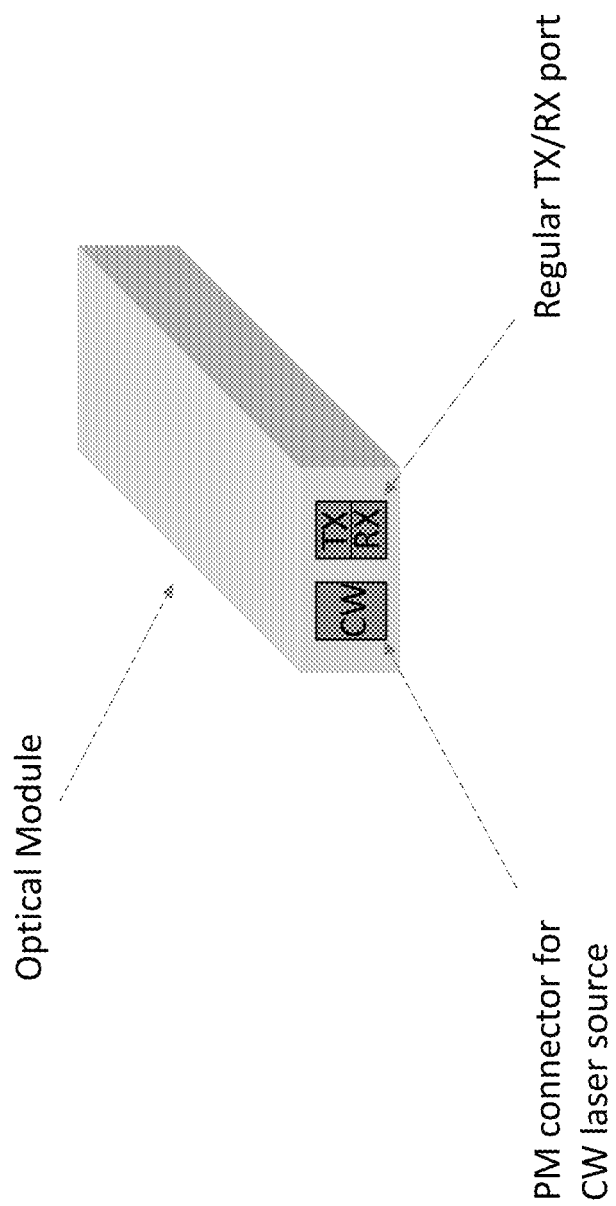

FIG. 6 is a diagram showing a general example of an access node chassis with a WDM optical transceiver module. Access node chassis 600 includes control unit 610 coupled to control network 640; and line cards 620, 622, and 624. Line card 622 includes WDM optical transceiver optical modules, including WDM optical transceiver optical module 638, with optical fiber connectors 630, 632, 634, and 636. Optical fiber connector 630 is coupled to a laser source 650 in an external chassis distinct from access node chassis 600. In some implementations, the WDM optical transceiver module 638 may not have an onboard laser source. Communication devices or components within the chassis of the laser source can also be coupled to control network 640, allowing communication between the laser source 650 and the control unit 610 to take place. In some implementations, the control unit 610 may not be coupled to the control network 640, or it may be coupled to the control network 640 in addition to being coupled to a cable (not shown) that may be used to transmit control messages between the control unit 610 and the laser source 650.

In some implementations, the control unit 610 may be used to control and regulate the amount of laser power that comes from the external laser source 650 to the WDM optical transceiver module 638. In particular, due to reasons such as the fiber loss, etc., the amount of laser power that arrives at the WDM optical transceiver module 638 may be different or even significantly different than the power of the laser beam transmitted by the laser source 650 (i.e., the power of the laser beam received by the WDM optical transceiver module 638 may not be at least substantially same as the desired or intended amount of power to be received by module 638). In such instances, the control unit 610 may receive data related to the characteristics of the laser beam generated and transmitted by the laser source 650 and the characteristics of the laser beam received by the WDM optical transceiver module 638, the characteristics including for example power level or range, wavelength range, etc. of each laser beam. For example, the WDM optical transceiver module 638 may include photodiodes for measuring the power levels of the received beams. Upon receiving these data, in such implementations, the control unit 610 may determine the proper calibration for the transmission of the laser power and generate control messages for sending to the laser source 650 to request adjustment to one or more characteristics of the laser beam being generated and transmitted by the laser source 650. For example, the control messages may request an increase in the generation and transmission of the power of the laser beam from the laser source 650 so as to compensate for losses that occur during transmission. In some implementations, this may occur on a continuous basis (or near-continuous basis, repeated basis, periodic basis, etc.) during the operation of the WDM optical transceiver module 638.

In some implementations, the transmission of signals carrying the control messages and/or the data between the external laser source 650 and the control unit 610 or the WDM optical transceiver module 638 (or generally the access node chassis 600 that includes the control unit 610 and the line card 622, which in turn includes the WDM optical transceiver module 638) may occur via a control network 640 to which both the control unit 610 and the communication devices or components within the chassis of the external laser source 650 are coupled. In some implementations, however, the messaging may not occur via a control network, and instead the data and messages may be exchanged via the cable that is used to couple the external laser source 650 to the WDM optical transceiver module 638 (via the line card 622, for example). In some implementations, dedicated transmitter/receiver may be used for these data/control messages, but in some cases, it may be preferable not to use the devices of the same kind as those already employed by the WDM module for high data rate communication in order to reduce the size and power consumption of the WDM optical transceiver module 638. In some embodiments, electrical connectivity may be established via a cable which shall include electrical wires capable of low-speed communication (like a serial or SPI bus). In some embodiments, a source generator may be utilized to add some slow modulation (e.g., dithering tone or AM modulation) by driving with a slow signal the laser current supply. The receiver could then pair the tap power monitor to an electrical device that could decode such information.

In some implementations, the cable that couples the laser source, and carries the laser beam, to the WDM optical transceiver module 638 may be a cable capable of carrying the signals carrying the control messages and data exchanged between the laser source 650 and the module 638 in a bi-directional manner. In some other implementations, the cable may be used as previously proposed as uni-directional. In the implementations where the cable is capable of carrying electrical signals in addition to optical signals, the cable may include at least one electrical wire (in addition to optical fibers, for example) and the signals carrying the control messages/data may travel via the at least one electrical wire. In such implementations, the nature of the signals carrying the control messages/data may be electrical. In the embodiments where the signals carrying the control messages/data are optical, the signals carrying the control messages/data may travel in dedicated optical fibers that are different from the optical fibers used to transport the laser beam (e.g., unmodulated continuous wave signal) that is being generated and transmitted by the external laser source 650 to the WDM optical transceiver module 638. In some implementations, the control messages/data may be exchanged via the same optical fibers as those used by the laser beam from the laser source 650, and in such embodiments different techniques may be used to avoid or minimize the interference between the laser beam and the signals carrying the control messages/data.

In some implementations, a pilot signal may be used for the control messages/data with little or no perturbation of the laser beam (its amplitude, for example). For example, the pilot signal may be used to slowly change the power of the laser beam (hence, little or no perturbation to the laser beam) as the laser beam travels from the laser source 650 to the WDM optical transceiver module 638. In such implementations, the pilot signal carrying the control messages/data and the laser beam may be travelling on the same optical fiber but with little or no interference. Upon arrival at the WDM optical transceiver module 638, in some instances, the control unit 610 may determine the power of the received laser beam (e.g., using a power monitor that uses photodiodes) as well as the power of the laser beam generated by the external laser source 650 prior to transmission (e.g., from the data) so as to determine the laser beam adjustments that may be performed to receive a laser beam of desired characteristics. Example of such adjustments include adjustments in power levels, wavelength ranges, etc. In such implementations, the control unit 610 may then generate control messages requesting such adjustments and transmit the messages back to the laser source 650 in similar manner as described for transmission from the laser source to 650 the WDM optical transceiver module 638. In some implementations, back reflectors (that are adjustable so that control messages/data can be imparted) are located in the WDM optical transceiver module 638 and can be used to send signals back to the external laser source 650. In some embodiments, the laser beam and the control messages may be transmitted and received via signals of different wavelengths.

In some implementations, the optical fibers carrying the laser beam from the laser source 650 (e.g., an unmodulated CW laser source) may be polarization maintaining fibers, which may have so-called fast axis and slow axis. In such implementations, the control messages/data may be transmitted for example via the fast axis and the laser beam from the laser source 650 may be transmitted for example via the soft axis; as such, the control messages/data and the laser beam may be transmitted independently from each other, leading to little or no perturbation of the laser beam by the signal carrying the control messages/data. Upon arrival at the access node chassis 600, in such implementations, the signals carrying the control messages/data (e.g., on the fast axis) may be fed into the control unit 610 and the laser beam (e.g., on the slow axis) may be fed into the WDM optical transceiver module 638. In such implementations, the control unit 610 may proceed with the determination of the appropriate adjustments and the generation of further control messages as described above. An example embodiment illustrating the generation of a control message to adjust some characteristics of the laser generated and transmitted by the laser source 650 is provided with reference to FIG. 7.

Figure 7:
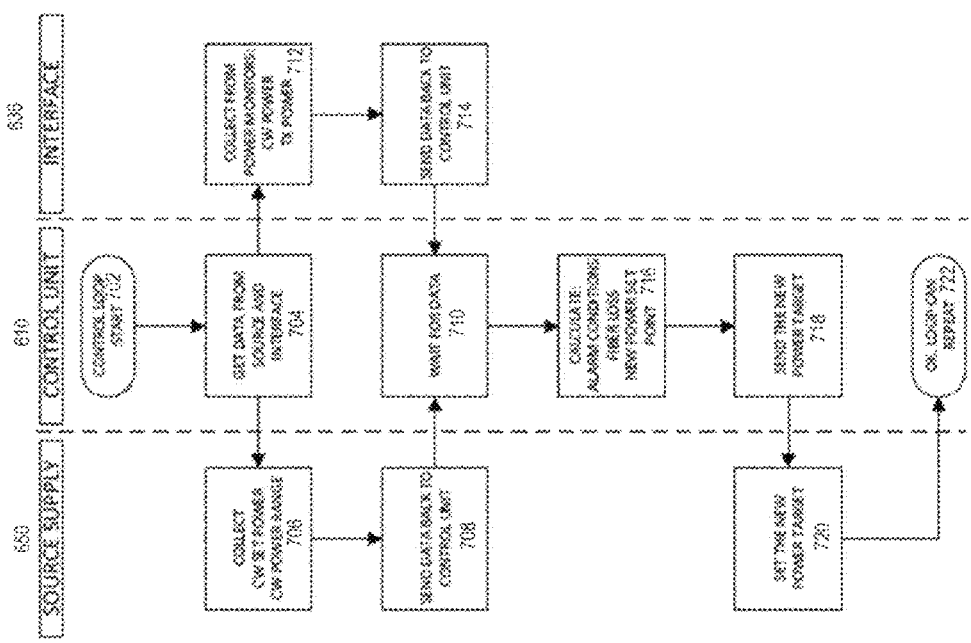
FIG. 7 is a diagram showing an example process flow of the WDM optical transceiver module in the access node.

FIG. 7 is a diagram showing an example process flow of the WDM optical transceiver module in the access node. The control loop controls the correct start-up and operation of the WDM optical transceiver optical module, including activation of laser source in the correct conditions. The control loop includes a supply of the laser source 650, control unit 610, and WDM optical transceiver optical module 638. At 702 the control loop starts. At 704 the control unit gets data from the source supply and the WDM optical transceiver optical module 638. The control path splits into two paths. In a first path, at 706 the supply of the laser source collects CW set power and CW power range. At 708 the supply of the laser source sends the collected data to the control unit. The exchange of data and control messages between the source supply of the laser source 650 and the control unit 610 may occur in any of the manners discussed above. In a second path, at 712 the WDM optical transceiver optical module collects data from power monitors of CW power of the laser source received at the WDM optical transceiver optical module. At 714 the WDM optical transceiver optical module sends the collected data to the control unit. The two paths merge again. At 710 the control unit waits and receives the collected data from 708 and 714. AT 716 the control unit calculates alarm conditions, fiber loss, and a new power set point. At 718 the control unit sends the new desired characteristics of the laser such as power target to the supply of the laser source. At 720 the supply of the laser source sets the new power set point for the laser source. At 722, the control unit repeats.

In one embodiment the WDM optical transceiver module is wavelength agnostic. To maintain accuracy in the power monitor of the wavelength agnostic module, active control loops set the bias of the Mach-Zehnder (MZ) modulator.

In another embodiment the WDM optical transceiver module has registers for the configuration of the wavelength, and control logic accesses the information. Knowing the wavelength allows for retrieving the bias information for the MZ modulator from a lookup table pre-populated during manufacturing and makes the power monitor reading more accurate.

Figure 8:
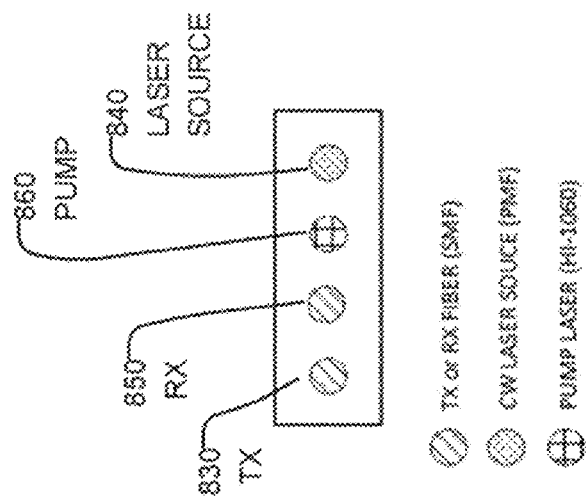
FIG. 8 is a diagram showing another example of the connector in between the WDM optical transceiver module and the optical fiber cable.

FIG. 8 is a diagram showing another example of the connector in between the WDM optical transceiver module and the optical fiber cable. The connector, such as an MPO connector or a series of line card (LC) connectors or other compact optical connectors, is an optical port made of multiple varieties of optical fibers including single mode fibers, polarization maintaining fibers, and pump laser fibers (e.g. HI-1060). The fiber used for modulated optical signal can be single mode or multi-mode. The fibers of the unmodulated continuous wave (CW) laser source are polarization maintaining fibers. The optional fibers of the pump lasers are fibers designed for that specific pump laser wavelengths, for example HI-1060 for 980 nm pump lasers. In some embodiments, standard single mode fibers may be used for pumps lasers, and these may result in some losses, which may not be significant for short fibers. Other embodiments vary the number of channels, the total number of fibers, and the number of fibers of each variety of fiber.

Example form factors of the WDM optical transceiver module are discussed. Example embodiments are a coherent analog pluggable optic. Example form factors are the CFP4 form factor 804 and the CFP2 form factor 802. The laserless CFP4-ACO removes the laser. Around 30% of the footprint is saved, the biggest height constraint is removed, and more power is left for the TOSA and ROSA.

Various embodiments have an MPO connector in the front or a line card (LC) connector. An example connector has the typical transmit (TX) and receive (RX) fibers and PM fibers that carry the CW laser source light. The CW laser source is split at the WDM optical transceiver module into signal and local oscillator paths, or multiple laser sources are coupled which helps meet the required TX power.

Figure 9:
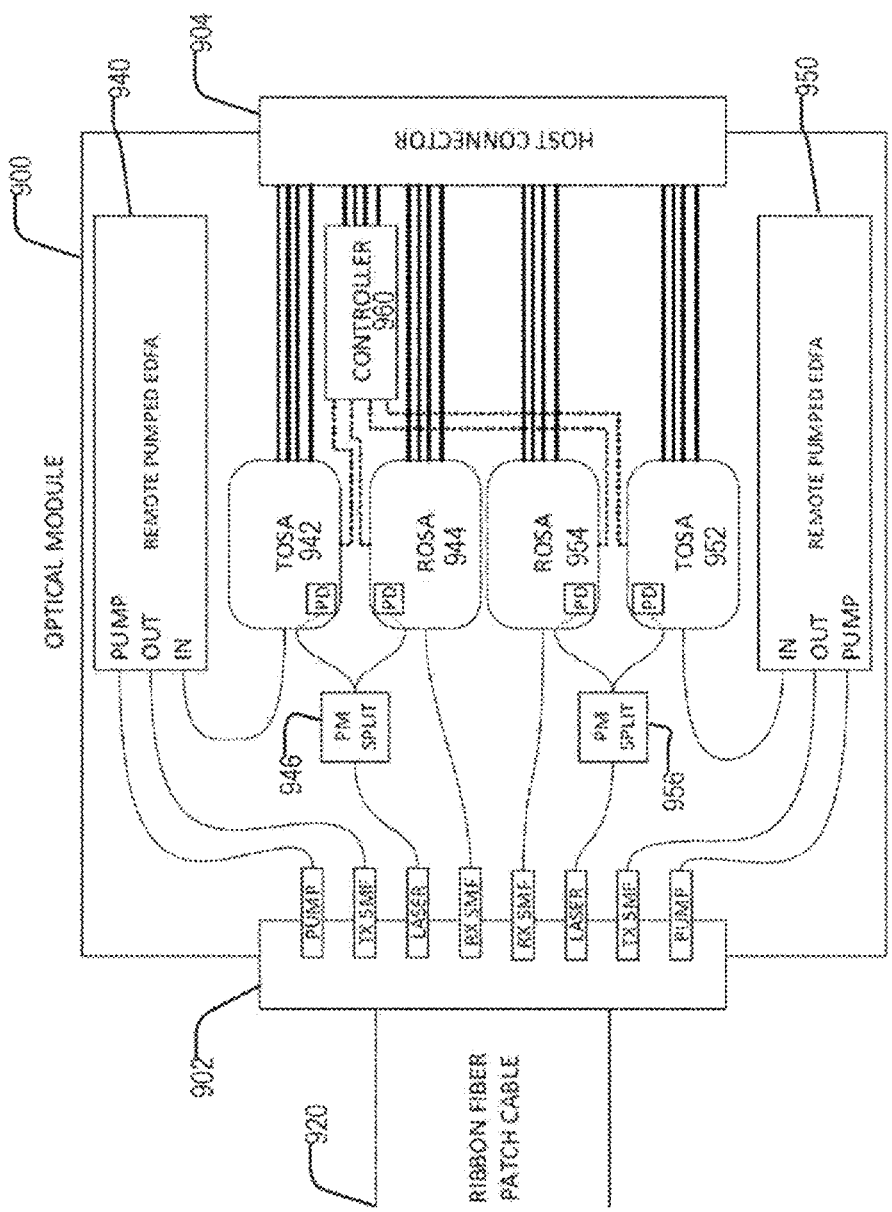
FIG. 9 is a diagram of an example of a WDM optical transceiver module with an external laser source and external optical pump.

FIG. 9 is a diagram of an example of a WDM optical transceiver module with an external laser source and external optical pump. WDM optical transceiver optical module 900 has optical fiber connector 902 that connects to ribbon fiber patch cable 920. Optical fiber connector 902 has a variety of fibers for each channel. A first channel has transmit and receive single mode fibers, polarization maintaining fiber of the laser source, and pump laser fiber. A second channel also has transmit and receive single mode fibers, polarization maintaining fiber of the laser source, and pump laser fiber.

In a first channel, polarization maintaining splitter 946 splits a first laser source between TOSA 942 and ROSA 944. TOSA 942 and ROSA 944 include respective photodiodes to measure the power of the outputs of polarization maintaining splitter 946. TOSA 942 is coupled to an input of remotely pumped Erbium-Doped Fiber Amplifiers (EDFA) 940. Remotely pumped EDFA 940 is coupled to an optical pump from the optical fiber connector 902. Remotely pumped EDFA 940 pumps the input received TOSA 942 and provides a pumped output to the optical fiber connector 902.

A second channel is similar to the first channel, with polarization maintaining splitter 956, TOSA 952, ROSA 954, and remotely pumped EDFA 950. Controller 960 is coupled to the photodiodes of TOSA 942, ROSA 944, TOSA 952, and ROSA 954. Controller 960 collects the monitored powers from the photodiodes and send the data back to a control unit as shown in FIG. 7.

Figure 10:
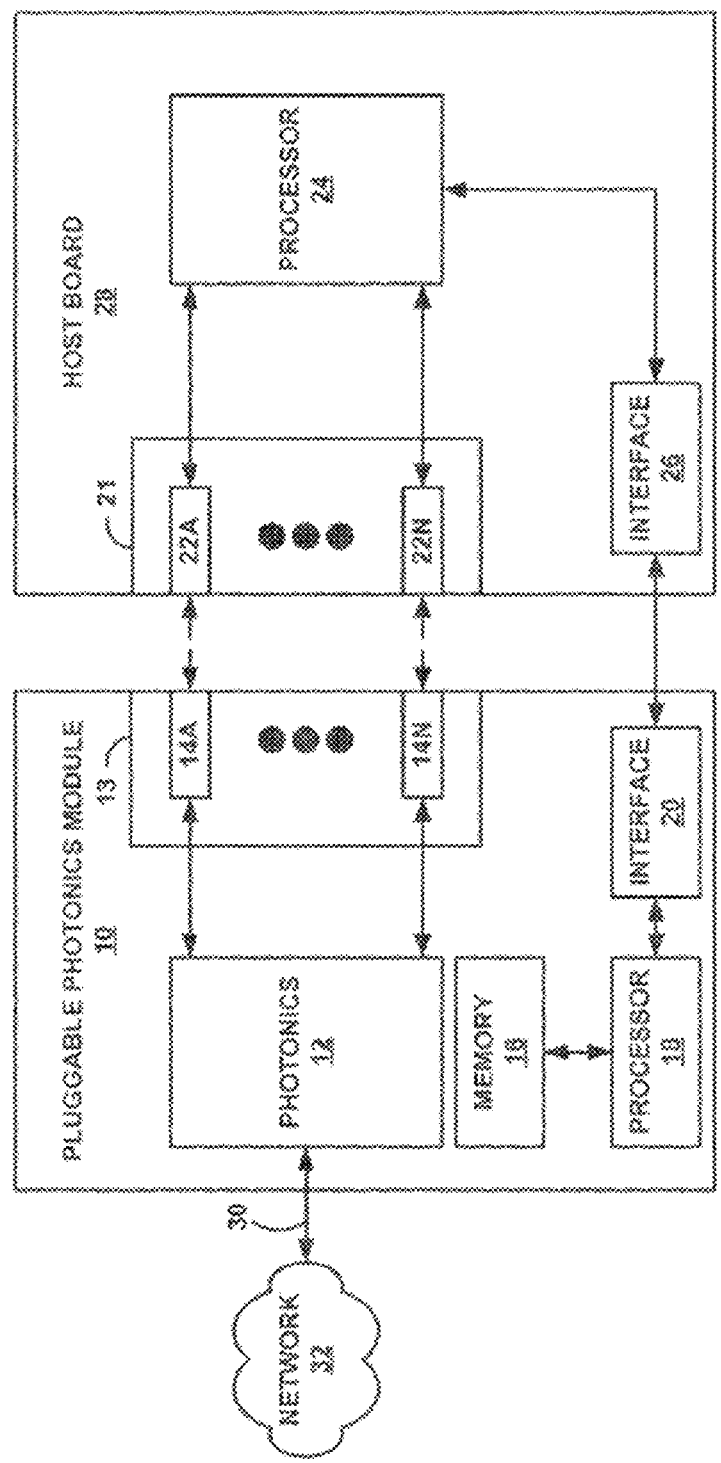
FIGS. 10-12 are diagrams showing the WDM optical transceiver module and the host board.

FIG. 10 is a block diagram illustrating pluggable photonics module 10 coupled to host board 28 in accordance with one or more examples such as any of FIGS. 1-9. The combination of pluggable photonics module 10 and host board 28 may be referred to as a network device. Host board 28 is referred to as a host board in that it "hosts" pluggable photonics module 10. That is, pluggable photonics module 10 may be a removable front end module that may be physically received by and removed from host board 28 operating as a back end module within a communication system or device. Pluggable photonics module 10 and host board 28 typically are components of an optical communication device or system (e.g., a network device) such as a wavelength-division multiplexing (WDM) system, including a dense wavelength division multiplexing (DWDM) system. For example, a WDM system may include a plurality of slots reserved for a plurality of boards, such as host board 28. Each host board 28 may receive one or more removable "pluggable" photonics module 10 to provide optical connectivity for one or more optical links 30. However, aspects are not limited to WDM systems. For purposes of illustration only and for ease of description, the examples are described in context of a WDM system.

In a WDM system, host board 28 or another board connected to host board 28 receives lower data rate optical or electrical signals from multiple devices such as switches or routers that host board 28 or the other board serializes together into higher data rate electrical signals. Pluggable photonics module 10 converts the electrical signals to an optical signal for further transmission into network 32 via optical link 30. Examples of network 32 include, but are not limited to, a wide area network (WAN) or the Internet.

In the reverse, pluggable photonics module 10 receives higher data rate optical signals via optical link 30 from network 32, and converts the optical signals to electrical signals. Host board 28 receives the electrical signals from pluggable photonics module 10, and host board 28 or the other board deserializes the electrical signals into a plurality of lower data rate optical or electrical signals for transmission to the routers and switches.

As the amount of data that needs to be transmitted to and received from network 32 increases, the data rate at which host board 28 needs to forward data to and from the routers and switches increases. For example, routers and switches are designed to receive and transmit data at ever higher data rates, and the WDM systems scale to the higher data rates to keep pace with data rates from the routers and switches. For instance, some versions of host board 28 and pluggable photonics module 10 operate at approximately 10 gigabits per second (Gbps), and other versions operate at 100 Gbps.

Scaling from 10 Gbps to 100 Gbps presents several design and cost challenges. For example, 10 Gbps data rate is sufficiently slow to allow simple modulation schemes such as on-off keying (OOK), sometimes referred to as non-return-to-zero (NRZ) modulation. In OOK modulation, the presence of a carrier wave for a specific duration represents a binary one, and its absence for the same duration represents a binary zero. However, OOK modulation may not be suitable at 100 Gbps, and more complex modulation schemes may be necessary. For example, hardware components may not be able to process OOK modulated data at the relatively high rate of 100 Gbps.

In some examples, 100 Gbps may require phase-shift keying (PSK) such as quadrature phase-shift keying (QPSK), as one example, although other modulation schemes are possible such as binary phase-shift keying (BPSK), polarization multiplexed BPSK (PM-BPSK, polarization multiplexed QPSK (PM-QPSK), M-quadrature amplitude modulation (M-QAM) (where M>4), or PM-M-QAM. For purposes of illustration, the example techniques are described with respect to QPSK modulation, and in particular PM-QPSK modulation. However, aspects of this disclosure should not be considered so limiting. The techniques are extendable to other modulation schemes such as those used for coherent optical communication systems. For instance, BPSK, PM-BPSK, QPSK, PM-QPSK, M-QAM, and PM-M-QAM modulation schemes may each require coherent optical detection, and pluggable photonics module 10 and host board 28 may be considered as being part of a coherent optical communication system.

Coherent optical communication systems refer to optical systems that utilize both magnitude and phase information for transmitting and receiving data such as for phase-shift keying modulation (e.g., BPSK, PM-BPSK, QPSK, PM-QPSK, M-QAM, or PM-M-QAM modulation). For example, in coherent optical communication systems, pluggable photonics module 10 may rely on a beating between a received signal and a local reference which maps both magnitude and phase information of the received optical electric field in the optical signal to measurable voltage or current. For instance, coherent optical communication systems may use a local carrier phase reference generated at pluggable photonics module 10 for the reception of optical signals from network 32. For example, as illustrated in more detail with respect to FIGS. 11 and 12, photonics 12 of pluggable photonics module 10 relies on an external laser source 34 and phase shifting optical hardware to mix pairs of data streams received from host board 28 for transmission as a single optical signal. Photonics 12 may also include the optical hybrid mixers to convert the received optical signal into the pairs (e.g., in-phase and quadrature phase) of data streams, referred to as I and Q data streams, for transmission to host board 28.

In PSK modulation, binary ones and zeros are represented by changing, or modulating, the phase of a carrier wave sometimes referred to as a lightwave. In this manner, both the magnitude and the phase of the optical signal are used to transmit data. For example, both the magnitude and the phase information of the received optical signal may be needed to recover the transmitted data.

In some examples, in addition, the modulated lightwave in one polarization may be multiplexed with another modulated polarization, which may be orthogonal to the previous one, to produce a polarization multiplexed (PM) signal, such as PM-QPSK. The polarizations of the lightwave signals may be chosen to be orthogonal to allow for a simple polarization beam splitter or polarizer for polarization demultiplexing when photonics 12 receives data from network 32.

In this way. PM-QPSK may be considered as a combination of two QPSK lightwave signals, where a first QPSK lightwave signal is for a first polarization of the lightwave, and the second QPSK lightwave signal is for a second polarization of the lightwave. Each of the QPSK lightwave signals utilizes four phases to encode two bits per symbol. Accordingly, PM-QPSK modulation utilizes four phases to encode two bits per symbol per polarization, which results in four bits per symbol.

For example, PM-QPSK modulation uses four input electrical data streams per polarization to impart the complex information on the optical carrier. The electrical signal for each polarization contains a pair of in-phase (I) and quadrature (Q) data streams that represent the complex data waveform. For example, in PM-QPSK modulation, there may be two in-phase data streams and two quadrature data streams, and one in-phase (I) data stream and one quadrature (Q) data stream forms one pair of a complex number, and the other I data stream and the other Q data stream forms another pair of a complex number. Each of the in-phase and quadrature data stream pairs may be nominally orthogonal to one another, in polarization, once the electrical data streams impart their complex information on the optical carrier. Each of these I or Q electrical data streams can be single-ended or differential. For OOK modulation, a single data stream is sufficient to impart the data on the lightwave, and similarly, a single data stream is sufficient to recover the data after detection by a photo-detector.

In PM-QPSK modulation, the input optical signal includes two lightwaves that are polarized orthogonally with respect to one another (e.g., one is horizontally polarized light, and the other is vertically polarized light, as an illustrative example). However, the polarization need not always be horizontal and vertical polarized light, and need not always be orthogonal. For ease of description, one of the lightwaves may be referred to as lightwave with polarization 1, and the other as lightwave with polarization 2. Each of the lightwaves may be associated with a particular magnitude and phase. The magnitude and phase of each of the lightwaves may be represented as a complex signal that includes real and imaginary aspects.

For example, for PM-QPSK modulation, photonics 12 receives an optical signal via optical link 30 that includes lightwave with polarization 1 and lightwave with polarization 2. Optical components within photonics 12 extract the lightwave with polarization 1 and the lightwave with polarization 2 from the received optical signal. The optical components further mix the lightwave with polarization 1 with a lightwave output from a local oscillator, received from external to the photonics 12 and received from external to module 10, generate an in-phase optical data stream, referred to as $I_1$ to indicate that it is for the lightwave with polarization 1, and to generate a quadrature optical data stream, referred to as $Q_1$ to indicate that it is for the lightwave with polarization 1. The $I_1$ data stream is proportional to the real aspect of the complex signal of the lightwave with polarization 1, and the $Q_1$ data stream is proportional to the imaginary aspect of the complex signal of the lightwave with polarization 1.

Similarly, the optical components also mix the lightwave with polarization 2 with a lightwave output from a local oscillator, received from external to the photonics 12 and received from external to module 10, to generate an in-phase optical data stream, referred to as $I_2$ to indicate that it is for the lightwave with polarization 2, and to generate a quadrature optical data stream, referred to as $Q_2$ to indicate that it is for the lightwave with polarization 2. Similar to $I_1$ and $Q_1$, the $I_2$ data stream is proportional to the real aspect of the complex signal of the lightwave with polarization 2, and the $Q_2$ data stream is proportional to the imaginary aspect of the complex signal of the lightwave with polarization 2.

In this manner, the pairs of I/Q optical data streams (e.g., a first pair that includes $I_1$ and $Q_1$, and a second pair that includes $I_2$ and $Q_2$) together represent the received optical signal. For example, $I_1$ and $Q_1$ together represent the specific magnitude and phase of the lightwave with polarization I, and $I_2$ and $Q_2$ together represent the specific magnitude and phase of the lightwave with polarization 2. Also, in this example, the lightwave with polarization 1 and the lightwave with polarization 2 together form the original received optical signal.

This relative increase in modulation complexity from a 10 Gbps data rate to a 100 Gbps data rate (e.g., from OOK modulation to QPSK modulation) is part of scaling a WDM system from 10 Gbps to 100 Gbps. For example, additional care is taken to maintain signal integrity because of the high data rate and the complex modulation. For instance, because PM-QPSK modulation results in a plurality of data streams (e.g., two pairs of I and Q data streams), with each pair representing both magnitude and phase information of the lightwave signal, the signal integrity for the pairs of data streams is maintained to properly recover both the magnitude and phase information of the received optical signal.

Such scaling may also increase cost. For example, the cost for photonics needed for 10 Gbps may be substantially less than the cost for photonics needed for 100 Gbps. Photonics, as used in this disclosure, refers commonly to the hardware components such as lasers and photodiodes needed for optical communication. For 100 Gbps with PM-QPSK modulation, the photonics include optical IQ modulators for each of the polarization multiplexed data streams to transmit data. To receive data, the photonics include optical hybrid mixers for each polarization state. Photonics for 10 Gbps with OOK modulation may not require such IQ modulators and optical hybrid mixers, and may therefore be less costly.

In other techniques, because of the plurality of data streams (e.g., four data streams for PM-QPSK modulation) and the high data rates of the 100 Gbps systems, photonics and data processing components such as analog-to-digital converters (ADCs) and digital-to-analog converters (DACs) are on a common board. By placing photonics and ADCs and DACs on a common board, there will be minimal signal degradation between signals transmitted by the photonics to the data processing components or received by the photonics from the data processing components in 100 Gbps systems.

In these other examples where the photonics for 100 Gbps were not pluggable, because the components all resided on a common board, the WDM system may incur prohibitive costs in upgrading from a 10 Gbps WDM system to a 100 Gbps WDM system. For instance, one of the major costs in upgrading to a 100 Gbps WDM system is the photonics for 100 Gbps. It may be desirable to pre-populate the slots within the WDM systems with boards, such as host board 28, that operate at 100 Gbps, but defer costs associated with the expensive photonics needed for 100 Gbps. However, boards for 100 Gbps WDM systems that include the photonics may not allow deferral of costs associated with photonics and result in a relatively large upfront cost for upgrading.

The photonics for a relatively higher data rate WDM system (e.g., a 100 Gbps WDM system) can reside in a pluggable module, such as pluggable photonics module 10, rather than on host board 28. In this manner, photonics functions such as mixing of optical I and Q data stream pairs for PM-QPSK occur within pluggable photonics module 10, and other functions such as ADC, DAC and digital signal processing (DSP) functions occur on a different board such as host board 28 or another board coupled to host board 28 that is further downstream, rather than both functions occurring on a common board.

The pluggable design of pluggable photonics module 10 allows deferral of photonics costs. For example, the 100 Gbps WDM system may be pre-populated with a plurality of boards such as host board 28 for eventual upgrade to 100 Gbps. The cost of host board 28 may be substantially less than the cost of the photonics needed for 100 Gbps. Then, when 100 Gbps data rates are needed, a plurality of pluggable modules such as pluggable photonics module 10 are each plugged into respective ones of host board 28. In this manner, pluggable photonics module 10 provides a "pay as you grow" market strategy by deferring costs associated with the 100 Gbps photonics.

Also, pluggable photonics module 10 provides vendor options. For example, one vendor may provide a better 100 Gbps version of pluggable photonics module 10 compared to another vendor, and the pluggable design of pluggable photonics module 10 allows selection of the better 100 Gbps version of pluggable photonics module 10. Moreover, it is unknown whether there will be further advances in photonics technology, or whether the 100 Gbps WDM system will be needed for special use cases. The pluggable design has flexibility in upgrading to better versions of pluggable photonics module 10, as well as flexibility in selecting the photonics module needed for the special use cases.

As illustrated, host board 28 includes pluggable interface 21 and pluggable photonics module 10 includes pluggable interface 13, which is the reciprocal of pluggable interface 21. Pluggable interface 13 and pluggable interface 21 mate with one another to couple pluggable photonics module 10 to host board 28. With pluggable interface 13 and pluggable interface 21, pluggable photonics module 10 can be selectively coupled to or decoupled from host board 28.

Pluggable interface 13 includes connection points 14A-14N (collectively referred to as "connection points 14") and pluggable interface 21 includes connection points 22A-22N (collectively referred to as "connection points 22"). When pluggable photonics module 10 couples to host board 28, connection points 14 mate with corresponding connection points 22 to provide a continuous electrical path for data transmission and reception between pluggable photonics module 10 and host board 28.

For example, photonics 12 of pluggable photonics module 10 receives a downstream optical signal from network 32 via optical link 30. In this example, the downstream optical signal is modulated in accordance with the PM-QPSK modulation scheme. Photonics 12 converts the downstream optical signal into two pairs of I and Q optical data streams, and converts the two pairs of I and Q optical data streams to two pairs of I and Q electrical data streams (referred to as pairs of I/Q electrical data streams for ease of reference). In this example, the pairs of I/Q electrical data streams together represent magnitude and phase information for the received optical signal. Photonics 12 transmits the pairs of I/Q electrical data streams to host board 28 via the electrical path provided by the mating of connection points 14 to connection points 22.

Upstream, processor 24 transmits the pairs of I/Q electrical data streams to photonics 12 via the electrical path provided by the mating of connection points 22 to connection points 14. Photonics 12 receives the pairs of I/Q electrical data streams, and converts the pairs of I/Q electrical data streams into a single optical signal for upstream transmission to network 32 via optical link 30.

While pluggable photonics module 10 may provide cost deferment and design flexibility, the pluggable design may degrade the signal integrity of the pairs of I/Q electrical data streams received or transmitted by host board 28. For example, the mating of connection points 14 to connection points 22 may result in a less than ideal connection between pluggable photonics module 10 and host board 28, referred to as physical impairments of mating connection points 14 to connection points 22. For instance, connection points 14 and connection points 22 may not line up perfectly. Furthermore, even when connection points 14 and connection points 22 line up as close to ideal as possible, the connection between connection points 14 and connection points 22 may increase capacitance and inductance, as compared to if the components of pluggable photonics module 10 were directly coupled to the components of host board 28 (i.e., the components of pluggable photonics module 10 resided on host board 28).

These physical impairments negatively impact the signal integrity of the pairs of I/Q electrical data streams. For example, the physical impairments distort the pairs of I/Q electrical data streams transmitted by photonics 12. The increased capacitance and inductance may distort the amplitude of the pairs of the I/Q electrical data streams as a function of frequencies, as well as the phase (e.g., group delay as a function of frequency).

Because the pairs of I/Q electrical data streams transmitted by photonics 12 together represent the received optical signal, such distortions added by the physical impairments may make it difficult for processor 24 of host board 28 to accurately recover the magnitude and phase information of the received optical signal, and thereby increase the bit error rate (BER) to an undesirable level. For instance, in this example, the electrical data streams that processor 24 receives together represent the magnitude and phase information of the received optical signal. However, these electrical data streams also include electrical distortion caused by pluggable interface 13 and pluggable interface 21, which make it difficult for processor 24 to recover the magnitude and phase information of the received optical signal.

Processor 24 may compensate for the electrical distortion caused by pluggable interface 13 and pluggable interface 21 to recover the magnitude and phase information of the received optical signal. It should be understood that the recovered magnitude and phase information of the received optical signal may not be identical to the magnitude and phase information of the transmitted optical signal. For example, the received optical signal may also include optical distortion such as chromatic dispersion, as one non-limiting example. In examples described in this disclosure, processor 24 may also compensate for the optical distortion to recover magnitude and phase information of the original, transmitted optical signal.

For example, the optical signal that photonics 12 receives includes optical distortion. The optical components within photonics 12 extract the pairs of I and Q optical data streams. These extracted pairs of I and Q optical data streams may not be identical to the I and Q optical data streams that were mixed together for transmission to photonics 12 because of the optical distortion. After photonics 12 convert the pairs of I and Q optical data streams into pairs of I and Q electrical data streams, the pairs of I and Q electrical data streams represent the received optical signal, which included optical distortion. Then, when processor 24 receives the pairs of I and Q electrical data streams, these pairs of I and Q electrical data streams include both electrical distortion caused by pluggable interface 13 and pluggable interface 21 and optical distortion that was part of the received optical signal.

Processor 24 may compensate, on pairs of the I/Q electrical data streams, for the electrical distortion caused by pluggable interface 13 and pluggable interface 21 to recover the magnitude and phase information of the received optical signal. Processor 24 may also compensate for the optical distortion to recover the magnitude and phase information for the transmitted optical signal. In this manner, the I/Q electrical data streams may be substantially similar to the I/Q electrical data streams used to generate the transmitted optical signal.

For example, processor 24 includes one or more complex equalizers simultaneously compensating the amplitude (loss versus frequency) and the phase (group delay versus frequency) distortion due to physical impairments of the mating between pluggable interface 13 and pluggable interface 21. The term complex equalizers means that the equalizers operate on the real and imaginary parts of the complex signal. For example, for PM-QPSK, one equalizer may operate on the $I_1$ and $Q_1$ data streams together because $I_1$ represents the real aspect of the lightwave with polarization 1 and $Q_1$ represents the imaginary aspect of the lightwave with polarization 1. Another equalizer may operate on the $I_2$ and $Q_2$ data streams together because $I_2$ represents the real aspect of the lightwave with polarization 2 and $Q_2$ represents the imaginary aspect of the lightwave with polarization 2. In another example, a single equalizer may simultaneously compensate the amplitude and phase of both pairs of I/Q data streams.

Examples of processor 24 include, but are not limited to, a digital signal processor (DSP), a general purpose microprocessor, an application specific integrated circuit (ASIC), a field programmable logic array (FPGA), a combination thereof, or other equivalent integrated or discrete logic circuitry. In some examples, processor 24 may include other components for processing purposes such as ADCs and DACs, as further described below. Furthermore, although the one or more equalizers are described as being internal to processor 24, aspects of this disclosure are not so limited. These one or more equalizers may be external to processor 24. Accordingly, host board 28 may be considered as including the one or more equalizers.

The one or more equalizers receive distorted pairs of I/Q electrical data streams from pluggable photonics module 10 and modify the distorted pairs of I/Q electrical data streams to compensate for the distortion caused by the signal traveling across connection points 14 and connection points 22. The resulting modified pairs of I/Q electrical data streams may be substantially similar to the pairs of I/Q electrical data streams outputted by photonics 12.

The one or more equalizers may provide adaptive compensation, fixed compensation, or configurable compensation. For instance, the one or more equalizers may filter the received pairs of I/Q electrical data streams to compensate for the distortion. The filter shape for the equalizer filters may be adaptive, fixed, or configurable.

For adaptive impairment removal, the one or more equalizers estimate the amount of distortion caused by the physical impairment, and adapt the amount of compensation that is applied based on the estimated distortion. For fixed impairment removal, the one or more equalizers are preset with the amount of compensation, and provide the preset amount of compensation regardless of the amount of distortion.

In some examples, it may be possible to configure the amount of compensation that the one or more equalizers apply (i.e., configure the filter shape). For example, as illustrated in FIG. 10, pluggable photonics module 10 includes interface 20 and host board 28 includes interface 26. Interface 20 and interface 26 couple to one another when pluggable photonics module 10 couples to host board 28. When coupled, interface 20 transmits information to interface 26 regarding pluggable photonics module 10, which interface 26 forwards to processor 24. Based on the received information, processor 24 may configure the amount of compensation that the one or more equalizers apply.

For example, processor 24 may include a processing unit that receives the information from interface 20 via interface 26. The processing unit may utilize the received information to determine the amount of compensation that the one or more equalizers of processor 24 are to apply. In alternate examples, the processing unit may be external to processor 24. In these examples, the processing unit determines the amount of compensation that the one or more equalizers of processor 24 are to apply, and configures the one or more equalizers of processor 24 to apply the determined amount of compensation.

For instance, as illustrated, pluggable photonics module 10 includes memory 16 and processor 18. Examples of processor 18 include, but are not limited to, a DSP, a general purpose microprocessor, an ASIC, an FPGA, or other equivalent integrated or discrete logic circuitry. Examples of memory 16 include, but are not limited to, a random access memory (RAM), a read only memory (ROM), an electrically erasable programmable read-only memory (EEPROM), or other magnetic storage devices, flash memory, or any other medium that can be used to store information.

Memory 16 stores information about pluggable photonics module 10, and in some examples, information regarding the manner in which pluggable photonics module 10 will be used. The vendor of pluggable photonics module 10 may store such information in memory 16. In some examples, the vendor may also include information about the performance of pluggable photonics module 10, such as information that indicates that pluggable photonics module 10 includes low performance, low cost components, or low performance, low power components.

For example, memory 16 may store information regarding characteristics of the optical components of photonics 12, information regarding the type of modulation provided by photonics 12 (e.g., the type of QPSK or M-QAM modulation), information that provides an estimate of the amount of distortion caused by connection points 14 mating with connection points 22 (e.g., changes in magnitude and phase as a function of frequency), and any other type of information such as part number or vendor name pertinent to the functionality or behavior of pluggable photonics module 10 when coupled to host board 28. In some examples, processor 18 also transmits status information of pluggable photonics module 10. For example, if the components of photonics 12 are not functioning properly, processor 18 may transmit status information (e.g., an alarm) to processor 24 via interface 20 and interface 26.

When pluggable photonics module 10 is coupled to host board 28, processor 18 may retrieve the information stored in memory 16 and transmit the information to interface 20. Interface 20 converts the information received from processor 18 to a communication protocol for which interface 20 and interface 26 is configured. Processor 24 receives the information from interface 26 and determines the amount of compensation that the one or more equalizers should apply based at least on the received information.

Processor 24 may then configure the one or more equalizers to apply the determined amount of compensation. For example, based on information that indicates the changes in magnitude and phase, as a function of frequency, due to the pairs of I/Q electrical data streams traveling across pluggable interface 13 and pluggable interface 21 (e.g., across connection points 14 and connection points 22), processor 24 may determine the target filter shape that the one or more equalizers apply to compensate for the distortion. As another example, there may be a plurality of equalizer types from which processor 24 may select the equalizer that will compensate for the distortion. In this example, processor 24 may select the appropriate equalizer type based on the received information from processor 16.

In some examples, it may be sufficient for unidirectional communication from pluggable photonics module 10 to host board 28. In other embodiments host board 28 may transmit information to pluggable photonics module 10 for bi-directional communication. As one example, processor 24 transmits a command to processor 18, via interface 26 and interface 20, that defines the amplitude of the pairs of I/Q electrical data streams outputted by photonics 12. Processor 18, in turn, adjusts the amplitude of the pairs of I/Q electrical data streams outputted by photonics 12. As another example, processor 24 may determine that some tuning on the optical components of photonics 12 may result in better bit-error-rate (BER). In this example, processor 24 transmits a command to processor 18, via interface 26 and interface 20, that instructs processor 18 to tune the optical components of photonics 12, which processor 18 then tunes. Host board 28 and pluggable photonics module 10 communicate other examples of information with one another.

Interface 20 and interface 26 communicate with another using any standard or proprietary protocol, and the techniques of this disclosure are not limited to any specific communication protocol. In general, the communication between interface 20 and interface 26 need not necessarily require complex communication formats or high data rate communication; although, this may be possible. As one example, interface 20 and interface 26 may communicate with one another using the management data input/output (MDIO) protocol. In this example, interface 20 and interface 26 are MDIO interfaces. For example, MDIO interface 20 couples to MDIO interface 26 with a serial bus and each transmits or receives information via the serial bus. MDIO communication is provided for illustration purposes only.

Processor 24 includes one or more complex equalizers to compensate for the electrical distortion on the pairs of I/Q electrical data streams received from pluggable photonics module 10 to recover the magnitude and phase information of the received optical signal. These one or more equalizers are referred to as receiver (RX)-equalizers. In some examples, processor 24 may also include transmitter (TX)-equalizers that compensate the pairs of I/Q electrical data streams transmitted by processor 24.

For example, similar to the received pairs of I/Q electrical data streams, the data streams transmitted by processor 24 may be distorted due to the physical impairments of connection points 22 and connection points 14. To address this distortion, the one or more TX-equalizers modify the data streams transmitted by processor 24 before the signals travel across pluggable interface 21. For example, the one or more TX-equalizers modify the data streams to pre-compensate for the distortion such that after the physical impairments of connection points 22 and connection points 14 distort the pre-compensated data streams, the resulting data streams are substantially similar to the data streams transmitted by processor 24. Similar to the RX-equalizers, the TX-equalizers may be adaptive, fixed, or configurable.

Figure 11:
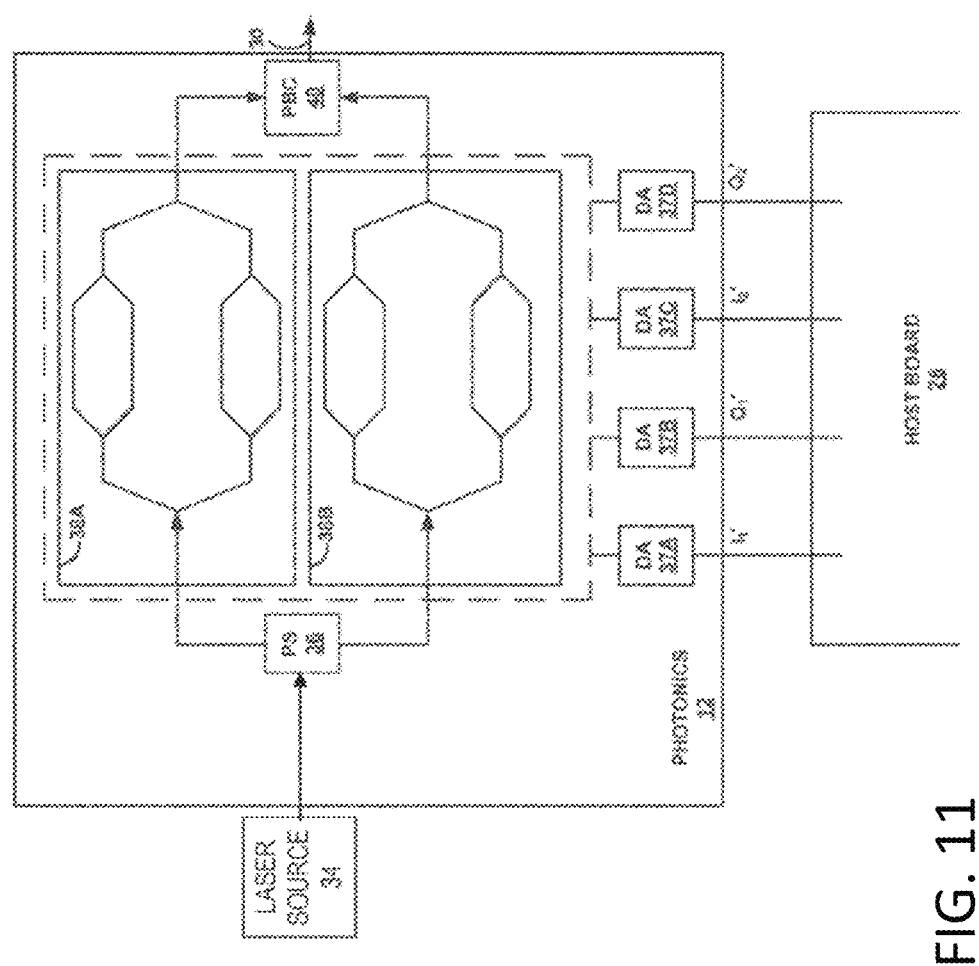
Figure 12:
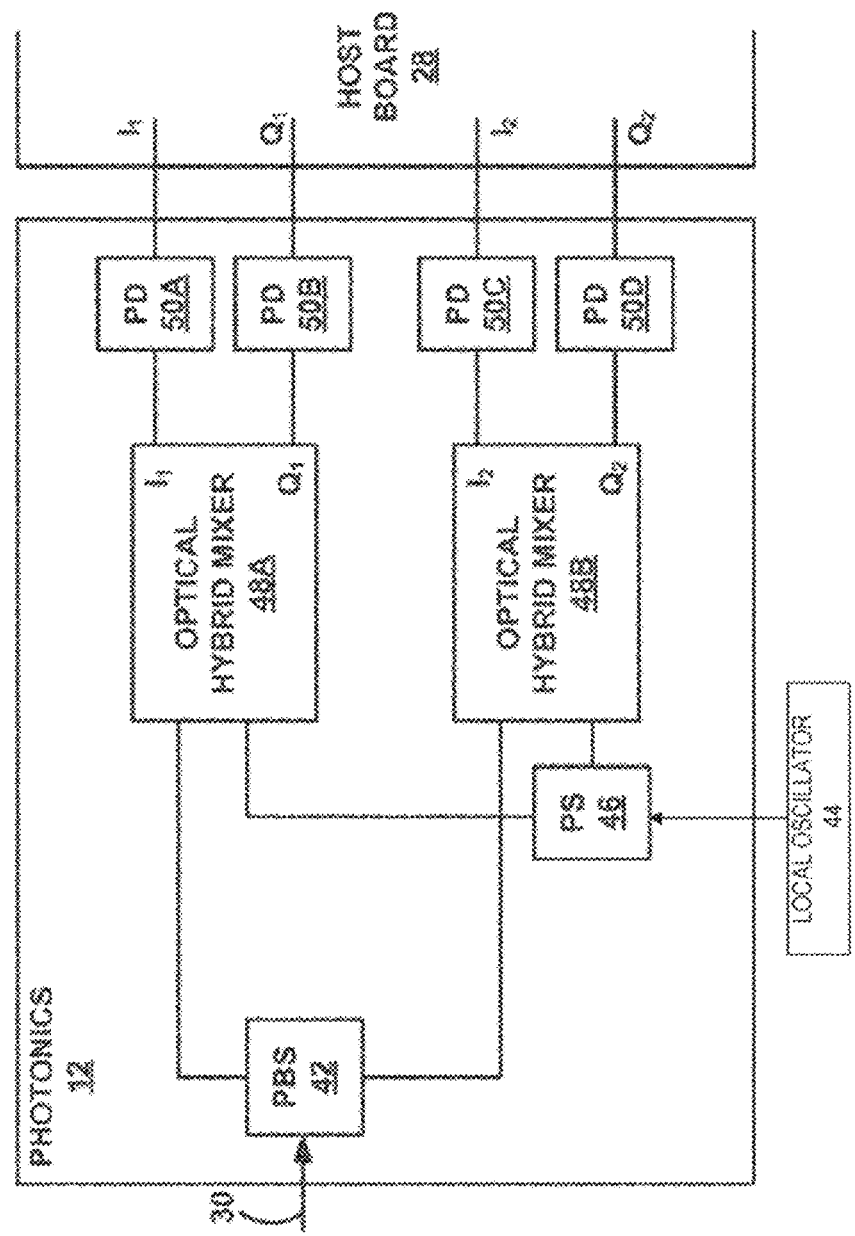

FIGS. 11 and 12 are block diagrams illustrating examples of photonics within a pluggable photonics module in accordance with one or more examples such as any of FIGS. 1-10. For example, FIG. 11 illustrates components of photonics 12 that receive I/Q electrical data streams from processor 24, convert the I/Q electrical data streams into a QPSK modulated optical signal or PM-QPSK modulated optical signal, and transmit the optical signal to network 32. FIG. 12 illustrates components of photonics 12 that receive a QPSK or PM-QPSK optical signal from network 32, convert the optical signal into I/Q electrical data streams, and transmit the I/Q electrical data streams to processor 24. FIGS. 11 and 12 are illustrated separately for ease of description. However, photonics 12 includes both the transmit photonics illustrated in FIG. 11 and the receive photonics illustrated in FIG. 12.

The components of photonics 12 are illustrated for PM-QPSK modulation. Photonics 12 may include additional, fewer, or different components than those illustrated based on the desired PM-QPSK modulation. In alternate examples, photonics 12 includes different components for different modulation schemes. For example, if BPSK modulation is desirable, photonics 12 includes components for coherent BPSK modulation. In general, photonics 12 includes components needed for the desired type of coherent communication, including even more complex modulation schemes such as multi-level quadrature amplitude modulation (M-QAM where M>4).

As illustrated in FIG. 11, for the transmit photonics of photonics 12 include polarization splitter (PS) 36, drive amplifiers 37A-37D, modulators 38A and 38B, and polarization beam combiner (PBC) 40. PBC 40 is coupled to optical link 30 and outputs an optical modulated signal (e.g., a PM-QPSK modulated optical signal). Also, as illustrated, photonics 12 receives $I_1'$, $Q_1'$, $I_2'$, and $Q_2'$ data streams, which are electrical data streams are outputted by processor 24 on host board 28 for PM-QPSK modulation.

In this disclosure, the terms $I_1'$, $Q_1'$, $I_2'$, and $Q_2'$ data streams are used to describe data streams that processor 24 transmits to pluggable photonics module 10, and the terms $I_1$, $Q_1$, $I_2$, and $Q_2$ data streams are used to describe data streams that processor 24 receives from pluggable photonics module 10. The $Q_1'$, $I_2'$, and $Q_2'$ data streams that processor 24 transmits may be different from the $I_1$, $Q_1$, $I_2$, and $Q_2$ data streams that processor 24 receives. For example, the $Q_1'$, $I_2'$, and $Q_2'$ data streams are for downstream communication, while the $I_1$, $Q_1$, $I_2$, and $Q_2$ data streams are for upstream communication.

In FIG. 11, the and $Q_1'$ data streams may form a first pair of data streams that processor 24 transmits, and may be for the lightwave with polarization 1. The $I_2'$ and $Q_2'$ data streams may form a second pair of data streams that processor 24 transmits, and may be for the lightwave with polarization 2. In some examples, the $I_1'$, $Q_1'$, $I_2'$, and $Q_2'$ data streams data streams may be composed of differential data streams that are AC coupled via capacitors to photonics 12.

In FIG. 11, the components of photonics 12 receive the $I_1'$, $Q_1'$, $I_2'$, and $Q_2'$ data streams from connection points 14, which mates with connection points 22 of host board 28. In some examples, photonics 12 may include drive amplifiers 37A-37D coupled to each one of the $I_1'$, $Q_1'$, $I_2'$, and $Q_2'$ data streams. Drive amplifiers 37A-37D may amplify the voltage level of the $I_1'$, $Q_1'$, $I_2'$, and $Q_2'$ data streams outputted by host board 28.

Laser 34, received from external to the photonics 12 and received from external to module 10, may be any type of laser that is usable for high bit rate optical signal transmission, typically a low linewidth laser in the 1550 nm wavelength range (so-called C-Band), but can be any wavelength. Optical amplifiers operating in same wavelength range may allow photonics 12 to transmit the generated optical signal a relatively far distance. An example is Erbium-Doped Fiber Amplifiers (EDFAs), which amplify light in the 1550 nm spectral region. The ability of photonics 12 to transmit the generated optical signal a relatively far distance reduces the number of intermittent optical-to-electrical-to-optical (O-E-O) repeaters needed to regenerate the transmitted optical signal.

Polarization splitter (PS) 36 receives the light from laser 34 and splits the light into (at least) two paths. Each one of modulators 38A and 38B receives light from one of the paths. Modulators 38A and 38B modulate the light on the respective paths with respective I/Q electrical data stream pairs. Modulators 38A and 38B may be referred to as IQ modulators or Cartesian modulators. In the example of 10, modulator 38A receives the $I_1'$ and $Q_1'$ electrical data streams and modulates the light to form a complex modulated lightwave signal, modulated in both magnitude and phase, forming a QPSK signal. Modulator 38B receives $I_2'$ and $Q_2'$ electrical data streams and modulates the light to form a complex modulated lightwave signal, modulated in both magnitude and phase, forming a second QPSK signal.

Polarization beam combiner (PBC) 40 receives the polarized and modulated optical signals from each one of modulator 38A and 38B. For instance, the optical QPSK signals from modulators 38A or 38B are then multiplexed in (nominally orthogonal) polarization using PBC 40. For example, PBC 40 combines the received QPSK optical signals into nominally orthogonal polarizations into a single polarization multiplexed (PM) optical signal and transmits the PM-QPSK optical signal to network 32 via optical link 30. In this manner, photonics 12 utilizes lightwave communications techniques to generate and transmit an optical PM-QPSK signal.

As illustrated in FIG. 12, the receive photonics of photonics 12 include polarization beam splitter (PBS) 42, local oscillator (LO) 44 received from external to the photonics 12 and received from external to module 10, polarization splitter (PS) 46, optical hybrid mixers 48A and 48B, and photo-detectors (PDs) 50A-50D. PDs 50A-50D convert the magnitude of the optical signal to an electrical representation. PBS 42 receives an optical signal from network 32 via optical link 30 and splits the received optical signal into first and second optical signals with nominally orthogonal polarization (e.g., substantially orthogonal polarization). Each one of optical hybrid mixers 48A and 48B receive respective optical signals from the first and second nominally orthogonal optical signals from PBS 42.

The receive photonics also include local oscillator 44 received from external to the photonics 12 and received from external to module 10, which is a laser. Local oscillator 44 provides the phase reference required in coherent system to recover the PM-QPSK optical waveform that photonics 12 receives. In some examples, local oscillator 44 may be a free running oscillator. For example, the laser signal outputted by local oscillator 44 may not need to be phase-locked with the optical signal that PBS 42 receives.

Polarization splitter (PS) 46 receives the light from local oscillator 44 from external to the photonics 12 and external to module 10, and splits the light into (at least) first and second light paths. PS 46 is substantially similar to PS 36 (FIG. 2A). Each one of optical hybrid mixers 48A and 48B receive respective local oscillator light from the first and second light paths from the PS 46. In some examples, the location of PBS 42 and PS 46 may be swapped with no loss of functionality, provided the light from local oscillator 44 is split into two nominally orthogonally polarized lightwaves.

Optical hybrid mixers 48A and 48B each mix the respective optical signals from PBS 42 with the respective local oscillator lightwave reference from PS 46 and output optical data stream representing in-phase (I) and quadrature-phase (Q) components of the PM-QPSK modulated signal. For example, optical hybrid mixer 48A outputs $I_1$ and $Q_1$ optical data streams. Optical hybrid mixer 48B outputs $I_2$ and $Q_2$ optical data streams. In some examples, optical hybrid mixers 48A and 48B may be 90 degree optical hybrid mixers. Also, in some examples, each one of the $I_1$, $Q_1$, $I_2$, and $Q_2$ optical data streams may be differentially encoded data streams.

Photo-detectors 50A-50D receive respective optical signals of the $I_1$, $Q_1$, $I_2$, and $Q_2$ optical data streams and convert these optical signals into electrical signals (e.g., the $I_1$, $Q_1$, $I_2$, and $Q_2$ data streams that processor 24 receives). Photo-detectors 50A-50D may be composed of a single photo-diode or a pair of nominally balanced photo-diodes. A transimpedence amplifier (TIA) element for each photo-detector may convert photo-current from the photo-diode(s) to a voltage representation. However, the inclusion of TIA elements may not be necessary in every example. The electrical output of each photo-detector in 50A-50D can be single-ended or differential electrical signals. In some examples, the TIA elements may include automatic gain control (AGC) amplifiers, or the AGC amplifiers may be external to the TIA elements. The AGC amplifiers may nominally maintain output electrical voltage amplitude/swing for varying input electrical current amplitude/swings.

In this manner, the receive photonics of photonics 12 convert the PM-QPSK modulated optical signal into electrical I and Q data stream pairs (e.g., the $I_1$, $Q_1$, $I_2$, and $Q_2$ data streams) representing the optical PM-QPSK signal for further processing by processor 24 of host board 28. For example, processor 24 receives the $I_1$, $Q_1$, $I_2$, and $Q_2$ electrical data stream pairs from photo-detectors 50A-50D through the mating between connection points 14 and connection points 22.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

The term "circuit" can include a dedicated hardware circuit, a general-purpose microprocessor, digital signal processor, or other processor circuit, and may be structurally configured from a general purpose circuit to a specialized circuit such as using firmware or software.

Any one or more of the techniques (e.g., methodologies) discussed herein may be performed on a machine. In various embodiments, the machine may operate as a standalone device or may be connected (e.g., networked) to other machines. In a networked deployment, the machine may operate in the capacity of a server machine, a client machine, or both in server-client network environments. In an example, the machine may act as a peer machine in peer-to-peer (P2P) (or other distributed) network environment. The machine may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions can enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Particular implementations of the systems and methods described herein may involve use of a machine (e.g., computer system) that may include a hardware processor (e.g., a central processing unit (CPU), a graphics processing unit (GPU), a hardware processor core, or any combination thereof), a main memory and a static memory, some or all of which may communicate with each other via an interlink (e.g., bus). The machine may further include a display unit, an alphanumeric input device (e.g., a keyboard), and a user interface (UI) navigation device (e.g., a mouse). In an example, the display unit, input device and UI navigation device may be a touch screen display. The machine may additionally include a storage device (e.g., drive unit), a signal generation device (e.g., a speaker), a network interface device, and one or more sensors, such as a global positioning system (GPS) sensor, compass, accelerometer, or other sensor. The machine may include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device may include a machine readable medium on which is stored one or more sets of data structures or instructions (e.g., software) embodying or utilized by any one or more of the techniques or functions described herein. The instructions may also reside, completely or at least partially, within the main memory, within static memory, or within the hardware processor during execution thereof by the machine. In an example, one or any combination of the hardware processor, the main memory, the static memory, or the storage device may constitute machine readable media.

While the machine readable medium can include a single medium, the term "machine readable medium" may include a single medium or multiple media (e.g., a centralized or distributed database, and/or associated caches and servers) configured to store the one or more instructions.

The term "machine readable medium" may include any medium that is capable of storing, encoding, or carrying instructions for execution by the machine and that cause the machine to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions may further be transmitted or received over a communications network using a transmission medium via the network interface device utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device may include one or more physical jacks (e.g., Ethernet, coaxial, or phone jacks) or one or more antennas to connect to the communications network. In an example, the network interface device may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine, and includes digital or analog communications signals or other intangible medium to facilitate communication of such software.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A wavelength division multiplexing (WDM) transceiver module, comprising:
   an optical port including:
      a data transmit optical fiber connector and a data receive optical fiber connector; and
      a laser source-in optical fiber connector configured to (1) couple to a laser source external to the WDM transceiver module, and (2) provide polarization alignment for a polarization-maintaining fiber, and
   an optical modulator operatively coupled to the optical port, the optical modulator configured to receive a laser output from the external laser source via the polarization-maintaining fiber and modulate the laser output based on analog electrical signals generated by a digital signal processor,
   the WDM transceiver module (1) not including an onboard laser source and (2) being operatively coupleable to or capable of integrated into a host board.

2. The module of claim 1, wherein the WDM transceiver module is coupleable to the host board such that the WDM transceiver module is pluggable into the host board.

3. The module of claim 1, wherein the WDM transceiver module is coupleable to the host board such the WDM transceiver module is pluggable into the host board and does not include the digital signal processor.

4. The module of claim 1, wherein the WDM transceiver module is integrated into the host board.

5. The module of claim 1, wherein the optical port further includes an optical pump-in optical fiber connector configured to couple to one or more external optical pumps.

6. The module of claim 1, wherein the optical port further includes an optical pump-in optical fiber connector configured to couple to one or more external optical pumps, the optical pump-in optical fiber connector including a specific-wavelength fiber, an operative wavelength of the specific-wavelength fiber substantially matching a wavelength of the optical pump laser.

7. The module of claim 1, wherein the WDM transceiver module is a coherent WDM transceiver module, the optical modulator is a polarization multiplexed in-phase and quadrature (PM-IQ) modulator configured to separately modulate in-phase and quadrature components of the laser output.

8. The module of claim 1, wherein the WDM transceiver module is a non-coherent WDM transceiver module, the optical modulator is not configured to modulate a phase component of the laser output.

9. The module of claim 1, further comprising a power monitor operatively coupled to the optical modulator and configured to monitor an optical power of the laser output received from the external laser source.

10. A system, comprising:
   a wavelength division multiplexing (WDM) transceiver module including a laser source-in optical fiber connector configured to receive a first laser output after transmission of a second laser output from an external laser source external to the WDM transceiver module, the WDM transceiver module not including an onboard laser source and being operatively coupleable to a host board; and
   a control unit configured to receive a second laser output data from the external laser source and a first laser output data from the WDM transceiver module, the control unit configured to:
      analyze the first laser output data and the second laser output data so as to determine information related to laser transmission conditions of the WDM transceiver module; and generate a control message for transmission to the external laser source based on the determined information.

11. The system of claim 10, wherein the determined information includes one or more of a power level of the second laser output from the external laser source, fiber loss during transmission of the second laser output from the external laser source, and alarm status of the WDM transceiver module.

12. The system of claim 10, wherein the control message includes instructions on an adjustment to a power level of the second laser output prior to transmission to the WDM transceiver module by the external laser source.

13. The system of claim 10, further comprising a power monitor operatively coupled to the WDM transceiver module and configured to monitor a power level of the first laser output.

14. The system of claim 10, further comprising a power monitor operatively coupled to the WDM transceiver module and configured to monitor a power level of the first laser output, the WDM transceiver module further including a Mach-Zehnder modulator that is configured to generate at least a portion of the first laser output data based on the monitored power level.

15. The system of claim 10, wherein the control message is transmitted to the external laser source via a control network coupled to the control unit and the external laser source.

16. A system, comprising:
a wavelength division multiplexing (WDM) optical transceiver module configured to receive a laser output transmitted by an external laser source external to the WDM transceiver module, the WDM transceiver module not including an onboard laser source; and
a control unit configured to receive data related to transmission of the laser output to the WDM transceiver module, the control unit configured to generate a control signal based at least in part on the received data, the control unit configured to transmit the control signal to the external laser source;
the transmission of the laser output to the WDM transceiver module and the transmission of the control signal to the external laser source occur via a same bi-directional cable.

17. The system of claim 16, wherein the control signal is an electrical signal and the bi-directional cable includes an electrical wire for transmitting the electrical signal.

18. The system of claim 16, wherein the control signal is an optical signal, and the laser output and the control signal are transmitted via a same polarization maintaining optical fiber, the bi-directional cable including the polarization maintaining optical fiber.

19. The system of claim 16, wherein:
the control signal is an optical signal and the bi-directional cable includes a polarization maintaining optical fiber; and
the laser output and the control signal are transmitted via a slow axis and a fast axis, respectively, of the polarization maintaining optical fiber.

20. The system of claim 16, wherein:
the control signal is an optical signal, the laser output is an unmodulated laser beam, and the bi-directional cable includes an optical fiber; and
the laser output and the control signal are transmitted out of band via the optical fiber.

* * * * *